(12) United States Patent
Ichikawa et al.

(10) Patent No.: US 11,732,626 B2
(45) Date of Patent: Aug. 22, 2023

(54) MIXER AND MOBILE BODY

(71) Applicant: HONDA MOTOR CO., LTD., Tokyo (JP)

(72) Inventors: Azuki Ichikawa, Wako (JP); Yuichi Fukuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/081,733

(22) Filed: Dec. 15, 2022

(65) Prior Publication Data

US 2023/0203975 A1 Jun. 29, 2023

(30) Foreign Application Priority Data

Dec. 28, 2021 (JP) ................. 2021-213611
Dec. 28, 2021 (JP) ................. 2021-213613

(51) Int. Cl.
| | |
|---|---|
| *F01N 3/05* | (2006.01) |
| *F02K 1/34* | (2006.01) |
| *B64D 27/10* | (2006.01) |
| *F02K 1/00* | (2006.01) |
| *B64D 33/10* | (2006.01) |
| *B64C 29/00* | (2006.01) |

(52) U.S. Cl.
CPC ............ *F01N 3/05* (2013.01); *B64D 27/10* (2013.01); *B64D 33/06* (2013.01); *B64D 33/10* (2013.01); *F02K 1/002* (2013.01); *B64C 29/0008* (2013.01)

(58) Field of Classification Search
CPC ...... F01N 13/082; F01N 13/10; F01N 13/107; F01N 13/20; F01N 2470/08; F01N 2470/24; F01N 2490/02–06; F01N 2490/08; F01N 3/05; F02K 1/002; B64D 33/06; B64D 33/10; B64D 27/10; B64D 29/0008
See application file for complete search history.

(56) References Cited

U.S. PATENT DOCUMENTS 1,840,862 A * 1/1932 Webb, Sr. ............... F01N 3/05
  181/262
2,293,632 A * 8/1942 Sauer ..................... F01N 3/05
  181/259

(Continued)

FOREIGN PATENT DOCUMENTS

| CN | 109184880 A * | 1/2019 | ........... F01N 13/082 |
| EP | 1798391 A2 * | 6/2007 | ........... F01N 13/002 |

(Continued)

OTHER PUBLICATIONS

CN-109184880-A translation (Year: 2019).*

(Continued)

*Primary Examiner* — Mickey H France
(74) *Attorney, Agent, or Firm* — Amin, Turocy & Watson, LLP

(57) ABSTRACT

A mixer is mounted in an aircraft. A rear end part of a cylindrical portion of the mixer is divided by a guide vane into a plurality of divided tubular portions. In the plurality of divided tubular portions, a notch nozzle is formed on an outer wall of the cylindrical portion. A plurality of guide holes are formed to extend from the outer wall of the cylindrical portion to a rear end surface of the guide vane.

19 Claims, 14 Drawing Sheets

(56) References Cited

U.S. PATENT DOCUMENTS

| | | | | |
|---|---|---|---|---|
| 2,822,886 | A * | 2/1958 | Schweitzer | F01N 3/06 55/452 |
| 3,630,031 | A * | 12/1971 | Grainger | F01N 3/26 60/308 |
| 3,630,032 | A * | 12/1971 | Grainger | F01N 3/34 60/308 |
| 4,093,040 | A * | 6/1978 | Treiber | F01N 13/14 181/252 |
| 4,587,804 | A * | 5/1986 | Horinouchi | F02K 1/36 60/230 |
| 5,127,602 | A * | 7/1992 | Batey | F02K 1/827 D12/345 |
| 5,746,630 | A * | 5/1998 | Ford | B63H 21/32 440/89 R |
| 7,086,224 | B1 * | 8/2006 | Perry | F01N 13/082 446/176 |
| 7,784,273 | B2 * | 8/2010 | Kanaya | F01N 13/009 60/303 |
| 8,397,495 | B2 * | 3/2013 | Salanta | B01F 25/4315 123/306 |
| 8,468,811 | B2 * | 6/2013 | Smith | F01N 13/082 60/320 |
| 8,615,984 | B2 * | 12/2013 | Kornherr | B01F 25/4312 60/303 |
| 2002/0166720 | A1 * | 11/2002 | Kusabiraki | F01N 13/08 181/240 |
| 2003/0080244 | A1 | 5/2003 | Dionne | |
| 2008/0196408 | A1 * | 8/2008 | Li | F01N 3/34 60/605.2 |
| 2009/0025362 | A1 * | 1/2009 | Chapkovich | F02K 1/825 60/264 |
| 2010/0146956 | A1 * | 6/2010 | Grudynski, III | F01N 13/08 60/324 |
| 2011/0131959 | A1 * | 6/2011 | Zhang | B01F 25/23 60/324 |
| 2014/0033686 | A1 * | 2/2014 | Fischer | B01F 25/3141 60/286 |
| 2017/0284271 | A1 * | 10/2017 | Bek | F01N 3/32 |
| 2021/0404415 | A1 * | 12/2021 | Johnson | F02K 9/97 |
| 2022/0203314 | A1 * | 6/2022 | Mitsui | F01N 13/082 |

FOREIGN PATENT DOCUMENTS

| | | | | |
|---|---|---|---|---|
| EP | 3216984 A1 * | 9/2017 | | F01D 25/30 |
| JP | 2005-507044 | 3/2005 | | |
| KR | 20160004154 A * | 1/2016 | | |
| WO | WO-2008019653 A1 * | 2/2008 | | F01N 13/082 |

OTHER PUBLICATIONS

EP-1798391-A2 translation (Year: 2007).*
EP-3216984-A1 translation (Year: 2017).*
KR-20160004154-A (Year: 2016).*
WO-2008019653-A1 translation (Year: 2008).*

* cited by examiner

MIXER AND MOBILE BODY

CROSS-REFERENCE TO RELATED APPLICATIONS

This application is based upon and claims the benefit of priority from Japanese Patent Applications No. 2021-213611 filed on Dec. 28, 2021, and No. 2021-213613 filed on Dec. 28, 2021, the contents all of which are incorporated herein by reference.

BACKGROUND OF THE INVENTION

Field of the Invention

The present invention relates to a mixer and a mobile body.

Description of the Related Art

JP 2005-507044 A discloses an auxiliary power unit for an aircraft. The auxiliary power unit includes an internal combustion engine, an exhaust pipe, a gas introduction pipe, a radiator, and a mixing lobe.

The exhaust pipe is connected to the internal combustion engine. The gas introduction pipe is connected to the exhaust pipe. The radiator is provided in the gas introduction pipe. The mixing lobe is disposed at a connected point between the exhaust pipe and the gas introduction pipe. At a time when the internal combustion engine discharges an exhaust gas (a first exhaust gas) into the exhaust pipe, the gas introduction pipe introduces outside air which serves as a cooling gas, due to a pressure difference between the first exhaust gas and the outside air. The radiator carries out heat exchange between a cooling oil and the cooling gas that was introduced through the gas introduction pipe. The cooling oil cools the internal combustion engine. In the interior of the exhaust pipe, the mixing lobe mixes the first exhaust gas and a spent gas (a second exhaust gas), which is the cooling gas having been subjected to the heat exchange. A mixed gas of the first exhaust gas and the second exhaust gas is discharged to the exterior through the exhaust pipe.

SUMMARY OF THE INVENTION

However, in JP 2005-507044 A, the first exhaust gas and the second exhaust gas are simply made to merge into a common flow. A configuration which is capable of improving the output efficiency of the internal combustion engine is desired.

The present invention has the object of solving the aforementioned problem.

A first aspect of the present invention is characterized by a mixer that mixes a first exhaust gas discharged from an internal combustion engine and a second exhaust gas discharged from a radiator, the mixer comprising a cylindrical portion including a front end part into which the first exhaust gas is introduced, and a rear end part from which the first exhaust gas is discharged, a guide vane including a plurality of partitions extending radially toward an outer wall of the cylindrical portion, the rear end part of the cylindrical portion being divided by the plurality of partitions into a plurality of divided tubular portions, a notch nozzle constituting the outer wall of the cylindrical portion, and including a notch formed in each of the plurality of divided tubular portions, and a plurality of guide holes formed to extend from the outer wall of the cylindrical portion to a rear end surface of the guide vane, in order to discharge the second exhaust gas from the rear end surface of the guide vane.

A second aspect of the present invention is characterized by a mobile body comprising the mixer according to the first aspect, an internal combustion engine, an exhaust pipe connected to the internal combustion engine, a generator connected to an output shaft of the internal combustion engine, and a radiator configured to cool a coolant of the generator by carrying out heat exchange between the coolant and the second exhaust gas, and to discharge the second exhaust gas having been subjected to the heat exchange into the exhaust pipe, wherein the mixer is disposed on an inner side of the exhaust pipe to mix the first gas discharged from the internal combustion engine and the second exhaust gas discharged from the radiator.

A third aspect of the present invention is characterized by a mixer that mixes a first exhaust gas discharged from an internal combustion engine and a second exhaust gas discharged from a radiator, the mixer comprising a cylindrical portion including a front end part into which the first exhaust gas is introduced, and a rear end part from which the first exhaust gas is discharged, a guide vane including a plurality of partitions extending radially toward an outer wall of the cylindrical portion, the rear end part of the cylindrical portion being divided by the plurality of partitions into a plurality of divided tubular portions, and a plurality of guide holes formed to extend from the outer wall of the cylindrical portion to a rear end surface of the guide vane, in order to discharge the second exhaust gas from the rear end surface of the guide vane, wherein the plurality of guide holes include a discharge opening formed on the rear end surface of the guide vane, a plurality of introduction holes formed in the outer wall of the cylindrical portion, and a plurality of communication holes formed in the plurality of partitions, and configured to allow communication between the discharge opening and the plurality of introduction holes, and wherein, within the discharge opening, a width of openings formed in rear end surfaces of the plurality of partitions becomes narrower as the openings approach the outer wall of the cylindrical portion, and a width of the plurality of introduction holes in a circumferential direction of the cylindrical portion becomes narrower as the introduction holes approach a center of the cylindrical portion.

A fourth aspect of the present invention is characterized by a mobile body comprising the mixer according to the third aspect, an internal combustion engine, an exhaust pipe connected to the internal combustion engine, a generator connected to an output shaft of the internal combustion engine, and a radiator configured to cool a coolant of the generator by carrying out heat exchange between the coolant and the second exhaust gas, and to discharge the second exhaust gas having been subjected to the heat exchange into the exhaust pipe, wherein the mixer is disposed on an inner side of the exhaust pipe to mix the first gas discharged from the internal combustion engine and the second exhaust gas discharged from the radiator.

According to the present invention, it is possible to improve the output efficiency of the internal combustion engine.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
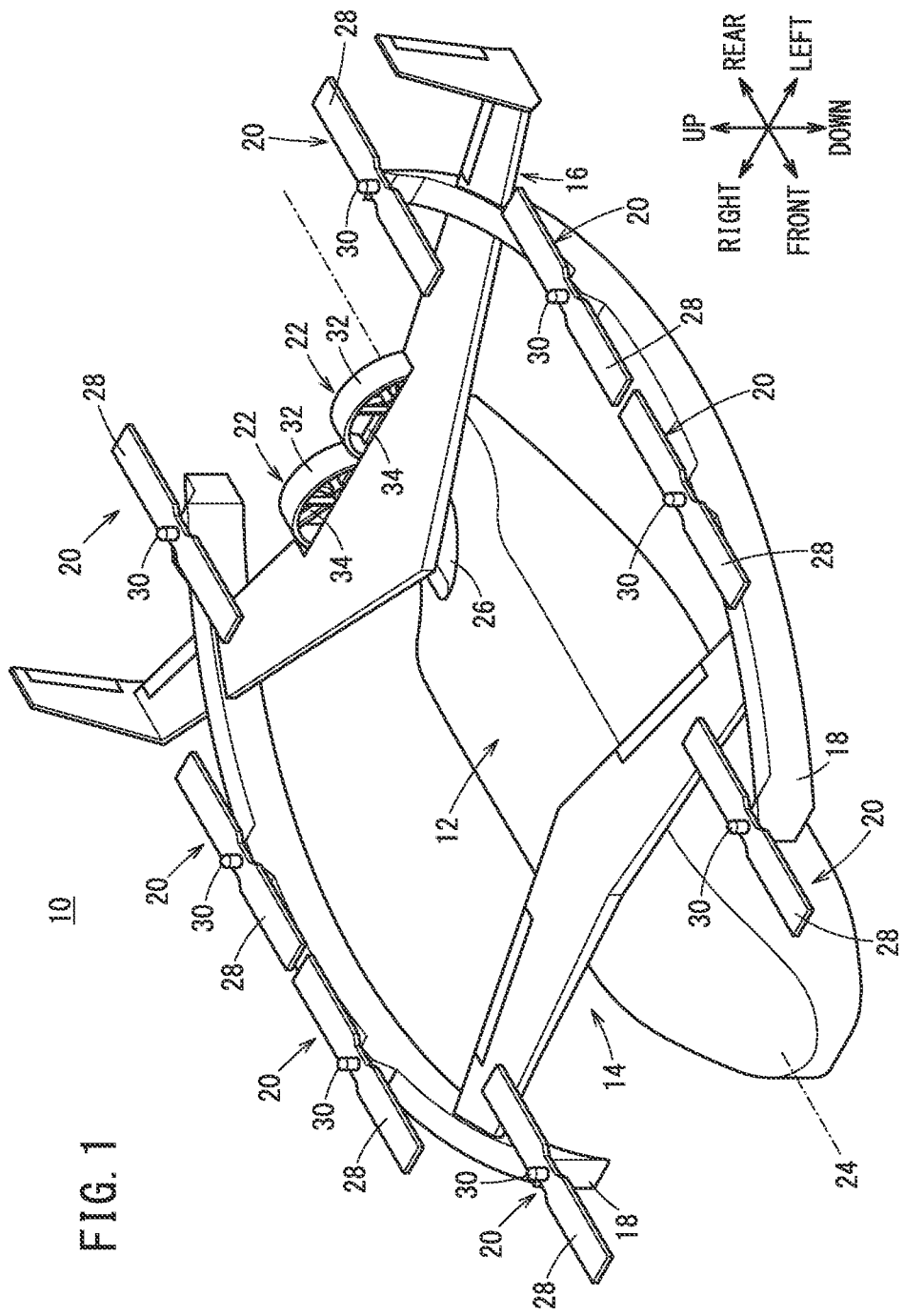
FIG. 1 is a perspective view of an aircraft.

FIG. 1 is a perspective view of an aircraft 10 (a mobile body) according to the present embodiment. The aircraft 10 is an electric vertical take-off and landing (eVTOL) aircraft. According to the present embodiment, forward/backward, left/right, and up/down directions will be described with the frontward direction (front direction) serving as a direction of movement at a time when the aircraft 10 moves (flies) in a horizontal direction.

The aircraft 10 is equipped with a fuselage 12, a front wing 14, a rear wing 16, a pair of left and right booms 18, eight rotors 20 used for take-off and landing, and two rotors 22 used for cruising. The fuselage 12 extends in the front-rear direction. Accordingly, a central axis 24 of the fuselage 12 extends in the front-rear direction. The aircraft 10 is laterally symmetrical about a vertical plane containing the central axis 24.

The front wing 14 is connected to an upper part of a front portion of the fuselage 12. The front wing 14 generates lift as the aircraft 10 moves forward. A pylon 26 is provided on an upper part of a rear portion of the fuselage 12. The rear wing 16 is connected via the pylon 26 to the upper part of the rear portion of the fuselage 12. The rear wing 16 generates lift as the aircraft 10 moves forward.

Two booms 18 are arranged laterally symmetrically about the vertical plane containing the central axis 24. The two booms 18 are rod-shaped members that extend from the front to the rear. The boom 18 on the right side curves in an arcuate shape toward the right (toward an outer side in the width direction of the aircraft 10). The boom 18 on the right side is connected to the front wing 14 and the rear wing 16 on the right side of the fuselage 12. The boom 18 on the left side curves in an arcuate shape toward the left (toward an outer side in the width direction of the aircraft 10). The boom 18 on the left side is connected to the front wing 14 and the rear wing 16 on the left side of the fuselage 12. The two booms 18 may also be straight rod-shaped members.

The eight take-off and landing rotors 20 are supported by the two booms 18. Among the eight take-off and landing rotors 20, the four take-off and landing rotors 20 on the right side are supported on an upper part of the boom 18 on the right side. Among the eight take-off and landing rotors 20, the four take-off and landing rotors 20 on the left side are supported on the boom 18 on the left side. Each of the eight take-off and landing rotors 20 includes a plurality of blades 28. Each of the eight take-off and landing rotors 20 generates lift by the plurality of blades 28 rotating about a shaft 30 that extends in the up-down direction. It is sufficient if the aircraft 10 is equipped with the plurality of take-off and landing rotors 20, and each of the plurality of take-off and landing rotors 20 is equipped with two or more blades 28.

The two cruising rotors 22 are arranged on the left and right at a rear end of the fuselage 12. A cylindrical duct 32 is provided around the periphery of each of the two cruising rotors 22. Each of the two cruising rotors 22 includes a plurality of blades 34. Each of the two cruising rotors 22 generates lift by the plurality of blades 34 rotating about a shaft that extends in the front-rear direction. The aircraft 10 may be equipped with only one cruising rotor 22. Alternatively, the aircraft 10 may be equipped with three or more cruising rotors 22.

Figure 2:
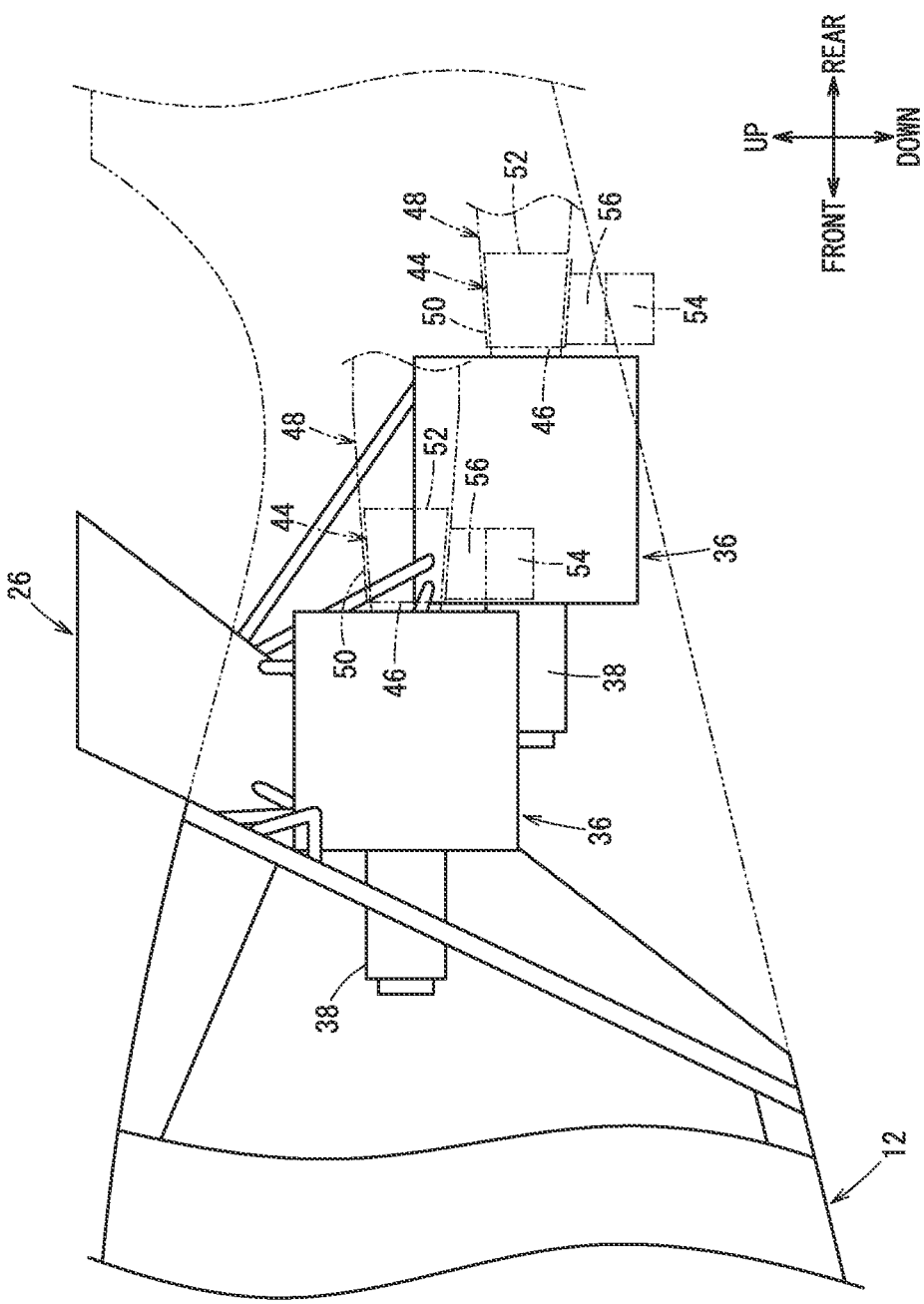
FIG. 2 is a side view showing the structure of an internal combustion engine and a surrounding periphery thereof.

As shown in FIG. 2, a plurality of sets of an internal combustion engine 36 and a generator 38 are accommodated in the interior of the rear portion of the fuselage 12. The plurality of sets of the internal combustion engine 36 and the generator 38 are arranged around the periphery of the pylon 26. The aircraft 10 is equipped with three sets of the internal combustion engine 36 and the generator 38. Moreover, the aircraft 10 may be equipped with one set of the internal combustion engine 36 and the generator 38. Further, the aircraft 10 may be equipped with two sets of the internal combustion engine 36 and the generator 38. Alternatively, the aircraft 10 may be equipped with four or more sets of the internal combustion engine 36 and the generator 38.

Figure 3:
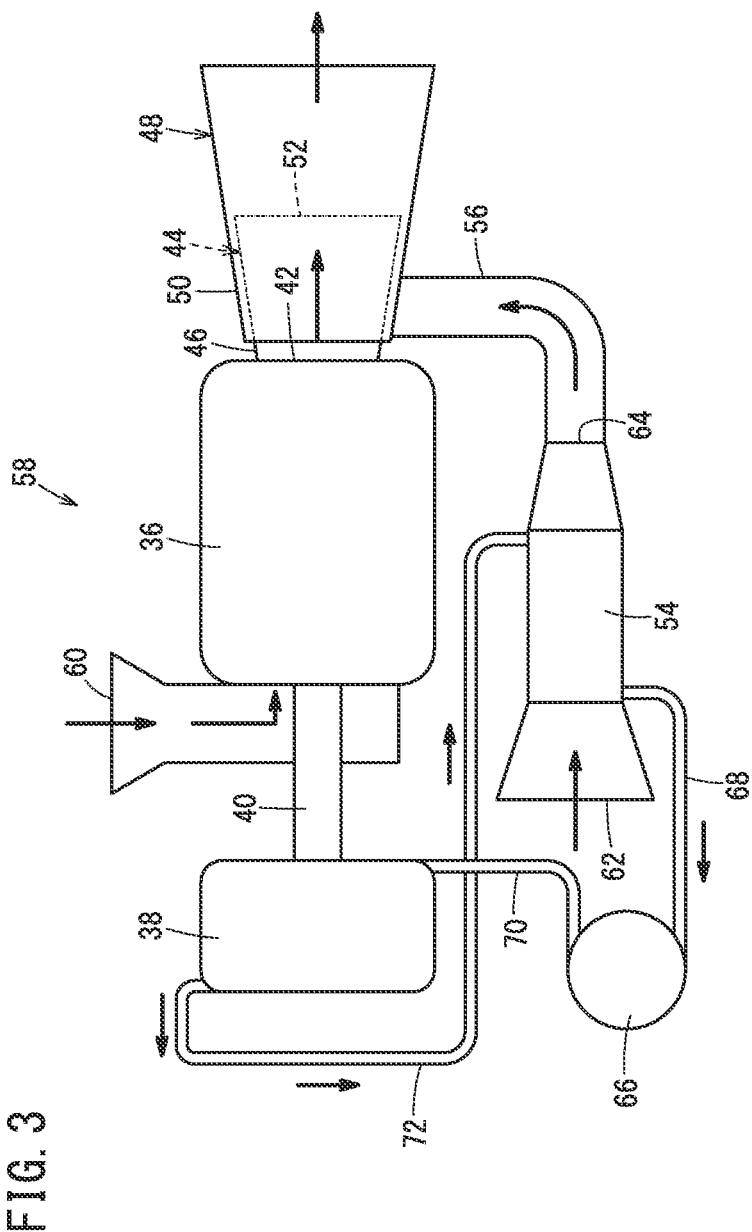
FIG. 3 is a configuration diagram of an aircraft electrical power generating system.

The internal combustion engine 36 and the generator 38 constitute one part of an electrical power generating system 58 (refer to FIG. 3). The aircraft 10 is equipped with a plurality of the electrical power generating systems 58. The electrical power generating systems 58 generate electrical power for driving the take-off and landing rotors 20 (refer to FIG. 1) and the cruising rotors 22. The configurations of the plurality of electrical power generating systems 58 are all the same. In the following description, one of the electrical power generating systems 58 from among the plurality of electrical power generating systems 58 will be singled out and described.

The internal combustion engines 36, for example, are gas turbine engines. The internal combustion engine 36 is arranged in a manner so that an output shaft portion 40 (refer to FIG. 3) faces in the frontward direction. The generator 38 is arranged in front of the internal combustion engine 36. The output shaft portion 40 of the internal combustion engine 36 is connected to a main shaft (not shown) of the generator 38.

An exhaust port 42 (refer to FIG. 3) is provided at a rear portion of the internal combustion engine 36. A front end part 46 of a mixer 44 is connected to the exhaust port 42. The mixer 44 extends in the rearward direction from the internal combustion engine 36. The mixer 44 is connected to an exhaust pipe 48.

As shown in FIG. 2, the exhaust pipe 48 is a tubular member that flares out in the rearward direction. The exhaust pipe 48 is a tubular member having a larger diameter than that of the mixer 44. A part of the mixer 44 is located at a front end part 50 of the exhaust pipe 48. A rear end part 52 of the mixer 44 is positioned in the interior of the exhaust pipe 48. The exhaust pipe 48 is connected to the rear portion (the exhaust port 42) of the internal combustion engine 36 via the mixer 44. The exhaust pipe 48 is arranged rearwardly of the internal combustion engine 36 with a certain gap therebetween in the front-rear direction.

Figure 4:
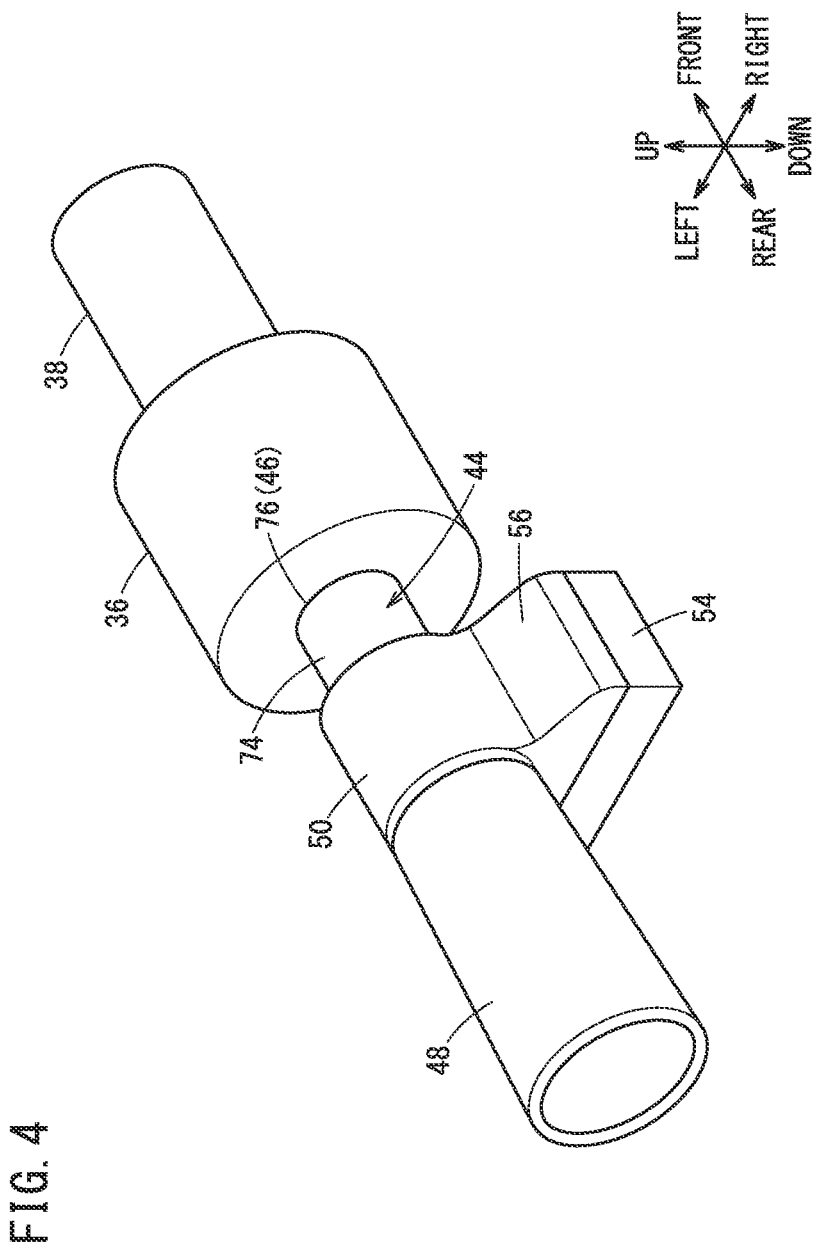
FIG. 4 is a perspective view showing the structure of the internal combustion engine and the surrounding periphery thereof.
Figure 8:
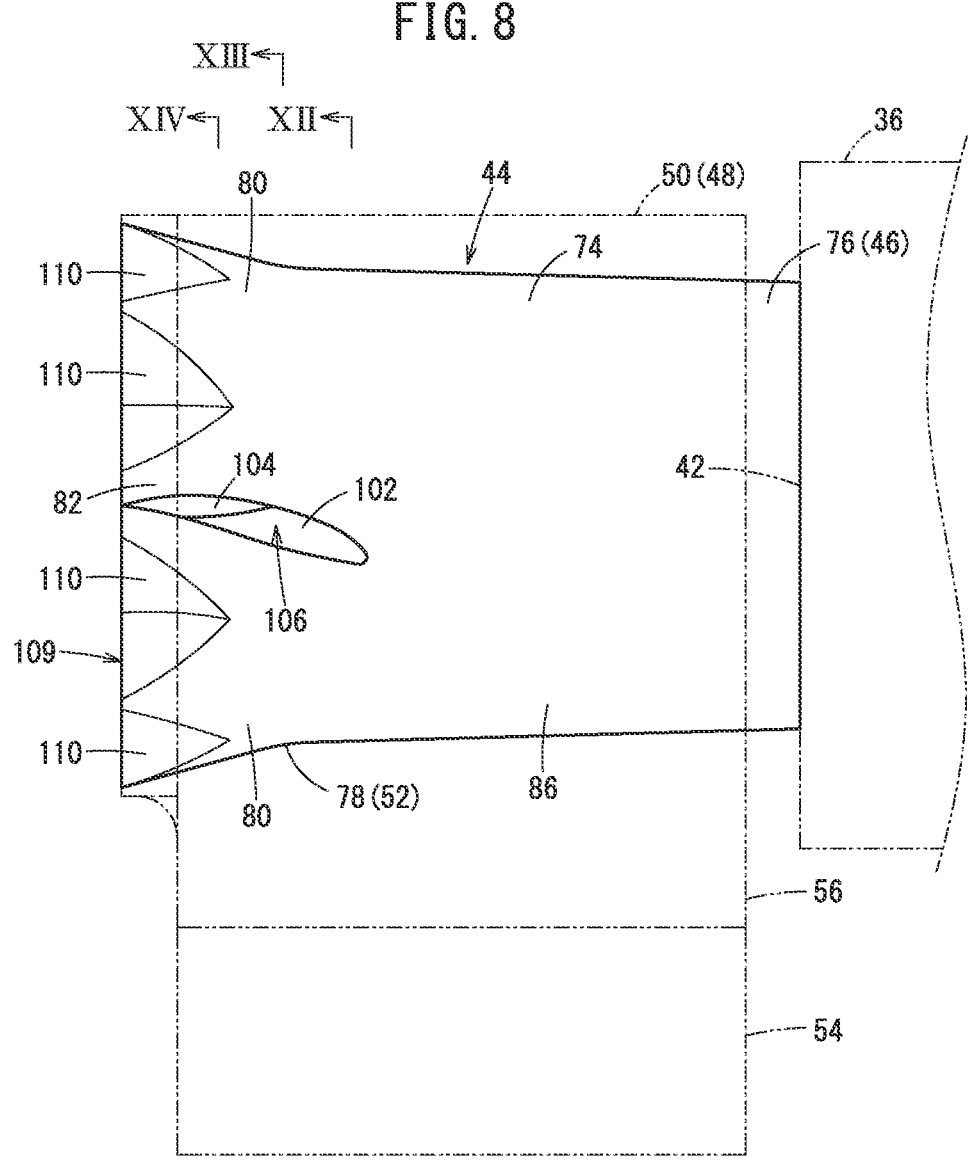
FIG. 8 is a side view showing the structure of the mixer and the surrounding periphery thereof.

As shown in FIG. 4, a radiator 54 is arranged downwardly of the front end port 50 of the exhaust pipe 48. The radiator 54 is positioned downwardly of the mixer 44. The outer shape of the radiator 54 is rectangular. The exhaust pipe 48 and the radiator 54 are connected via a connecting pipe 56. The connecting pipe 56 extends from the radiator 54 toward the front end part 50 of the exhaust pipe 48. The connecting pipe 56 has a shape tapering from the radiator 54 toward the exhaust pipe 48. As shown in FIG. 8, the length of the radiator 54 and the connecting pipe 56 in the front-rear direction is shorter than the length of the mixer 44 in the front-rear direction. More specifically, the front surfaces of the radiator 54 and the connecting pipe 56 are substantially flush with the front end surface of the exhaust pipe 48. Further, the rear surfaces of the radiator 54 and the connecting pipe 56 are positioned forwardly of the rear end surface of the mixer 44.

FIG. 3 is a schematic configuration diagram of the electrical power generating system 58. The electrical power generating system 58 includes the internal combustion engine 36, the generator 38, the exhaust pipe 48, the radiator 54, the connecting pipe 56, and an electric pump 66. The internal combustion engine 36 includes an air intake port 60 and the exhaust port 42. The radiator 54 includes an air intake port 62 and an exhaust port 64. The exhaust port 64 of the radiator 54 is connected to the connecting pipe 56. The radiator 54 and the electric pump 66 are connected by a first coolant passage 68. The electric pump 66 and the generator 38 are connected by a second coolant passage 70. The generator 38 and the radiator 54 are connected by a third coolant passage 72.

Next, a detailed configuration of the mixer 44 will be given in detail with reference to FIG. 4 to FIG. 14.

Figure 10:
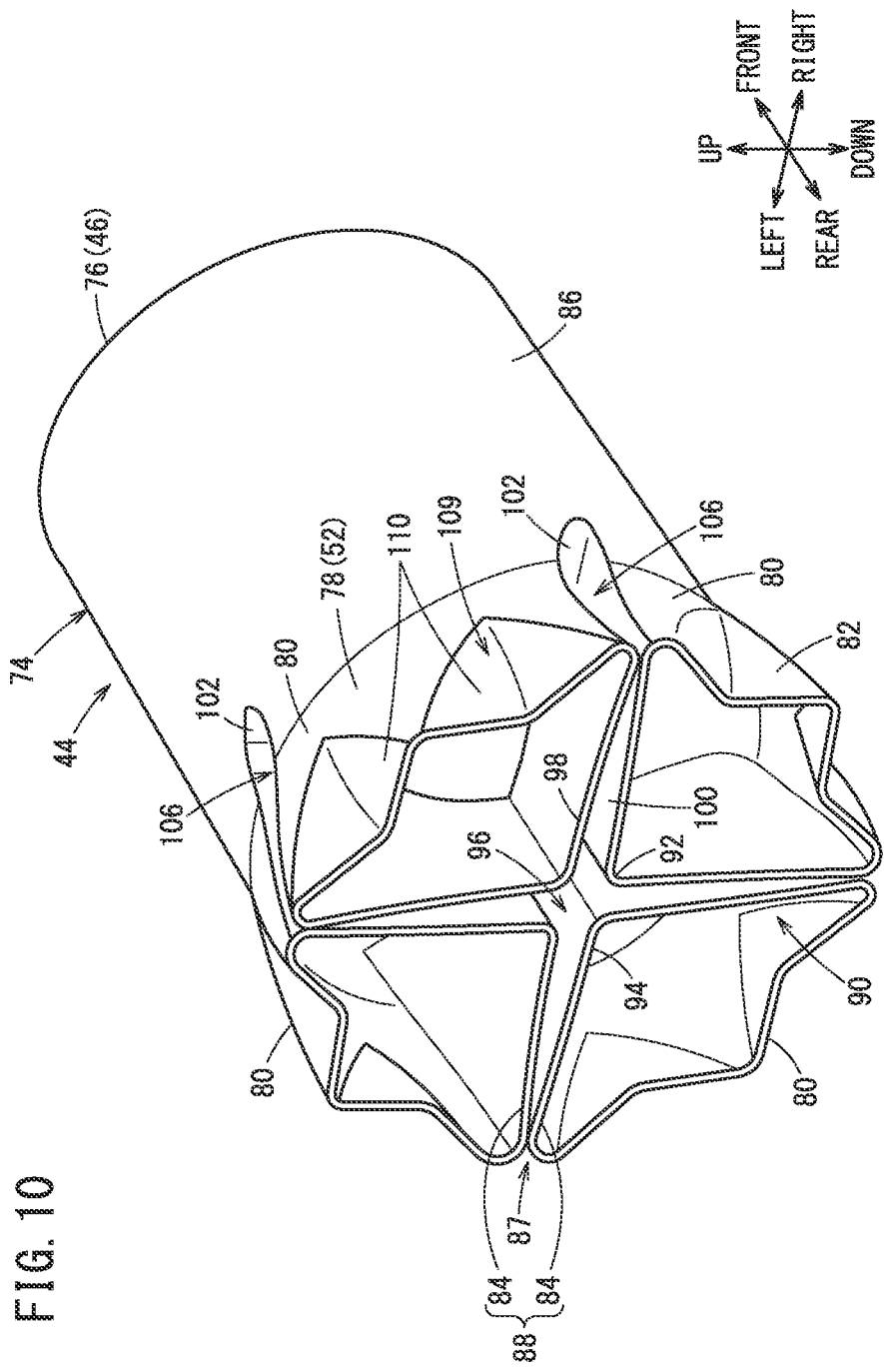
FIG. 10 is a perspective view of the mixer.

As shown in FIG. 10, the mixer 44 includes a cylindrical portion 74 that extends in the front-rear direction. As shown in FIG. 8, the cylindrical portion 74 is a cylindrical member with a smaller diameter than that of the exhaust pipe 48. A front end part 76 of the cylindrical portion 74 is connected to the exhaust port 42 of the internal combustion engine 36. A part of the cylindrical portion 74 is positioned in the interior of the exhaust pipe 48. A rear end part 78 of the cylindrical portion 74 is positioned in the interior of the exhaust pipe 48. The cylindrical portion 74 has a shape that flares out from the front end part 76 toward the rear end part 78.

As shown in FIG. 10, the rear end part 78 of the cylindrical portion 74 is equipped with a plurality of divided tubular portions 80. The plurality of divided tubular portions 80 are arranged from an intermediate portion to a rear end of the cylindrical portion 74. More specifically, the cylindrical portion 74 is branched from the intermediate portion to the rear end. The cylindrical portion 74 is branched by being partitioned by the plurality of divided tubular portions 80. The plurality of divided tubular portions 80 are assembled together around the central axis of the cylindrical portion 74. According to the present embodiment, a case will be described in which the mixer 44 includes four divided tubular portions 80. The mixer 44 may have two or three divided tubular portions 80. Alternatively, the mixer 44 may have five or more divided tubular portions 80.

Figure 6:
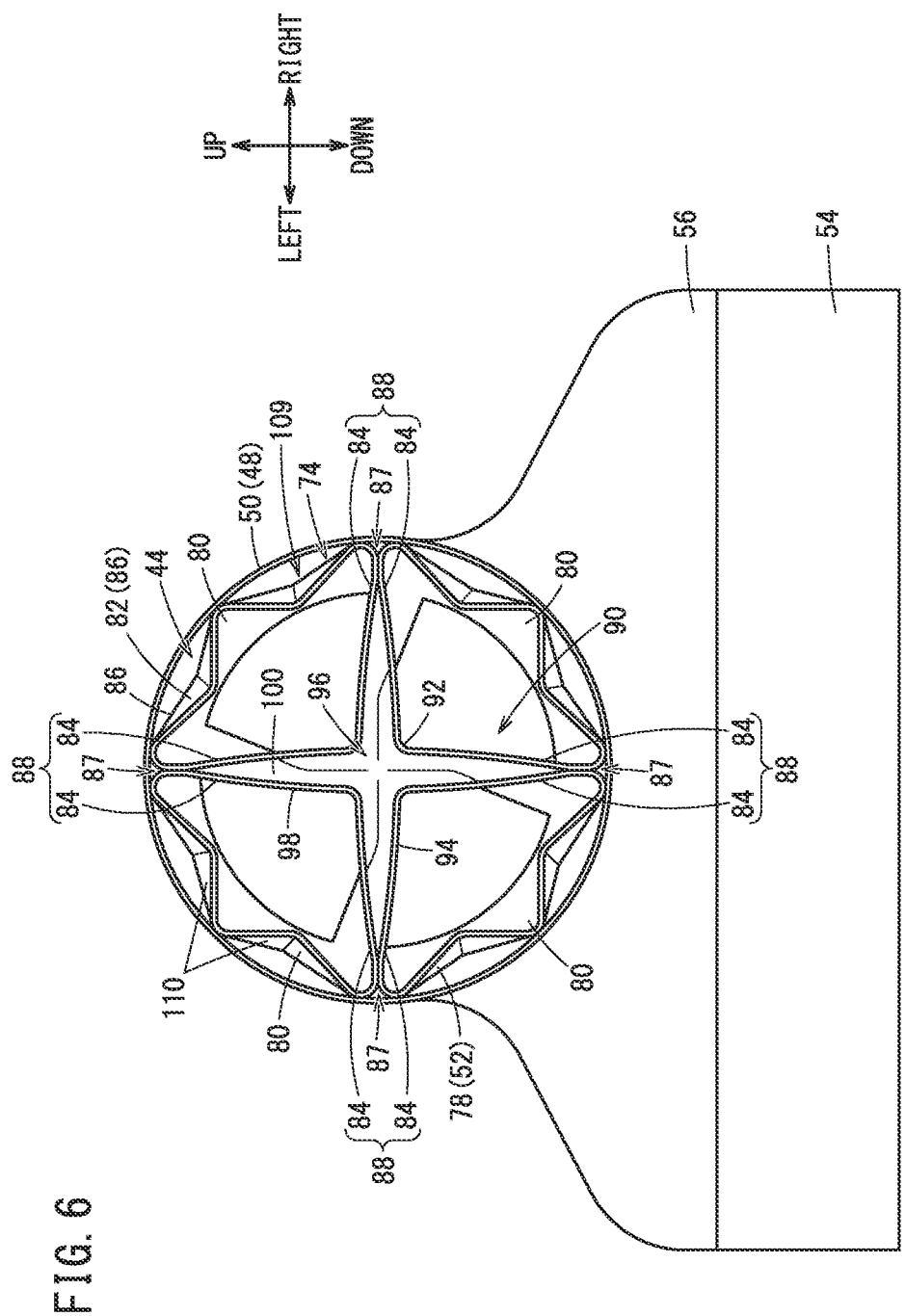
FIG. 6 is a rear view showing the structure of the mixer and the surrounding periphery thereof.

As shown in FIG. 6, the outer shape of the divided tubular portions 80 is substantially fan-shaped as viewed from the rear. The outer shape of the divided tubular portions 80 may be formed in any arbitrary shape. The opening area of the divided tubular portions 80 is smaller than the opening area of the cylindrical portion 74.

Each of the divided tubular portions 80 has one outer side wall portion 82 and two inner side wall portions 84. As shown in FIG. 10, the outer side wall portion 82 and the inner side wall portions 84 extend in the front-rear direction. One divided tubular portion 80 is formed by connecting one outer side wall portion 82 and two inner side wall portions 84. The outer side wall portions 82 of the divided tubular portions 80 form one part of an outer wall 86 of the cylindrical portion 74. As shown in FIG. 6, the respective inner side wall portions 84 extend substantially radially from a location in the vicinity of the center of the cylindrical portion 74 toward the outer wall 86 of the cylindrical portion 74. A location where one of the inner side wall portions 84 and another of the inner side wall portions 84 are connected is positioned in the vicinity of the center of the cylindrical portion 74.

The inner side wall portion 84 provided on one of the divided tubular portions 80, and the inner side wall portion 84 provided on another of the divided tubular portions 80 which is adjacent to the one divided tubular portion 80, face toward each other. The rear ends of the two inner side wall portions 84 facing toward each other come in closer proximity to each other as the inner side wall portions 84 approach the outer wall 86 of the cylindrical portion 74. The two inner side wall portions 84 facing toward each other are in contact with each other at a contact location 87. The contact locations 87 are positioned in the vicinity of the outer wall 86 of the cylindrical portion 74.

Figure 7:
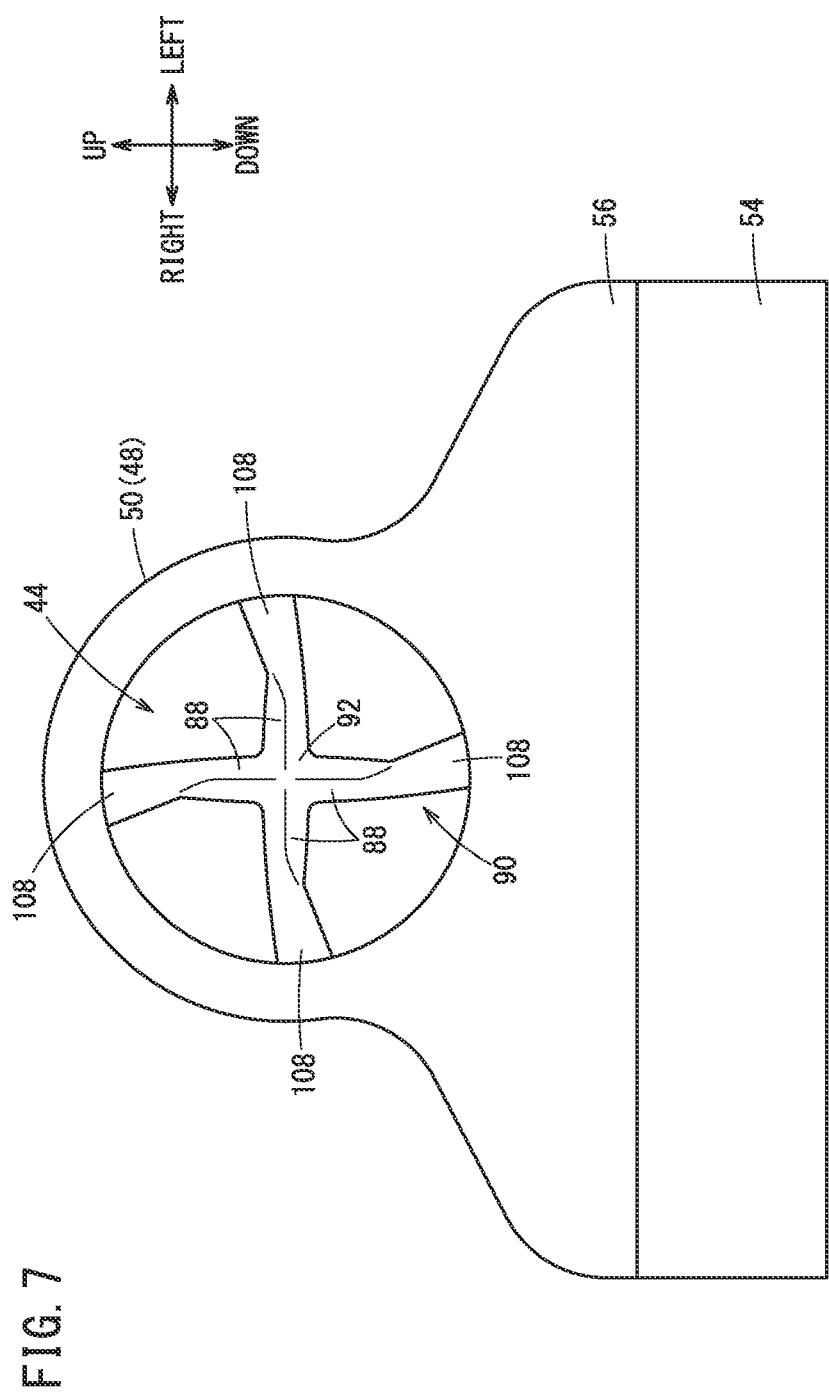
FIG. 7 is a front view showing the structure of the mixer and the surrounding periphery thereof.

The pair of inner side wall portions 84 facing toward each other constitute one partition 88. The mixer 44 includes four divided tubular portions 80. Accordingly, the mixer 44 includes four partitions 88. The four partitions 88 partition the inner side of the rear end part 78 of the cylindrical portion 74 into four internal spaces. The four partitions 88 extend radially from the center of the cylindrical portion 74 toward the outer wall 86 of the cylindrical portion 74. As shown in FIG. 7, front end parts of the pair of inner side wall portions 84 (refer to FIG. 6) facing toward each other are connected.

As shown in FIG. 6, a guide vane 90 is formed by a plurality of partitions 88. The guide vane 90 includes a base portion 92 positioned in the vicinity of the center of the cylindrical portion 74, and the plurality of partitions 88 that extend radially from the base portion 92. The guide vane 90 serves to rectify the flow of the first exhaust gas (the exhaust gas) discharged from the exhaust port 42 (refer to FIG. 8) of the internal combustion engine 36 toward the cylindrical portion 74.

A discharge opening 96 is formed on a rear end surface 94 of the guide vane 90. The discharge opening 96 is formed in a substantially cross shape by the plurality of inner side wall portions 84 that constitute the plurality of partitions 88. The discharge opening 96 includes a plurality of partial openings 100. The partial openings 100 are formed in rear end surfaces 98 of the partitions 88. The partial openings 100 are provided between the pairs of inner side wall portions 84 constituting the partitions 88. An opening width of the partial openings 100 becomes narrower as the openings approach the outer wall 86 of the cylindrical portion 74. In other words, the cross-sectional shape of the partitions 88 is V-shaped.

Figure 9:
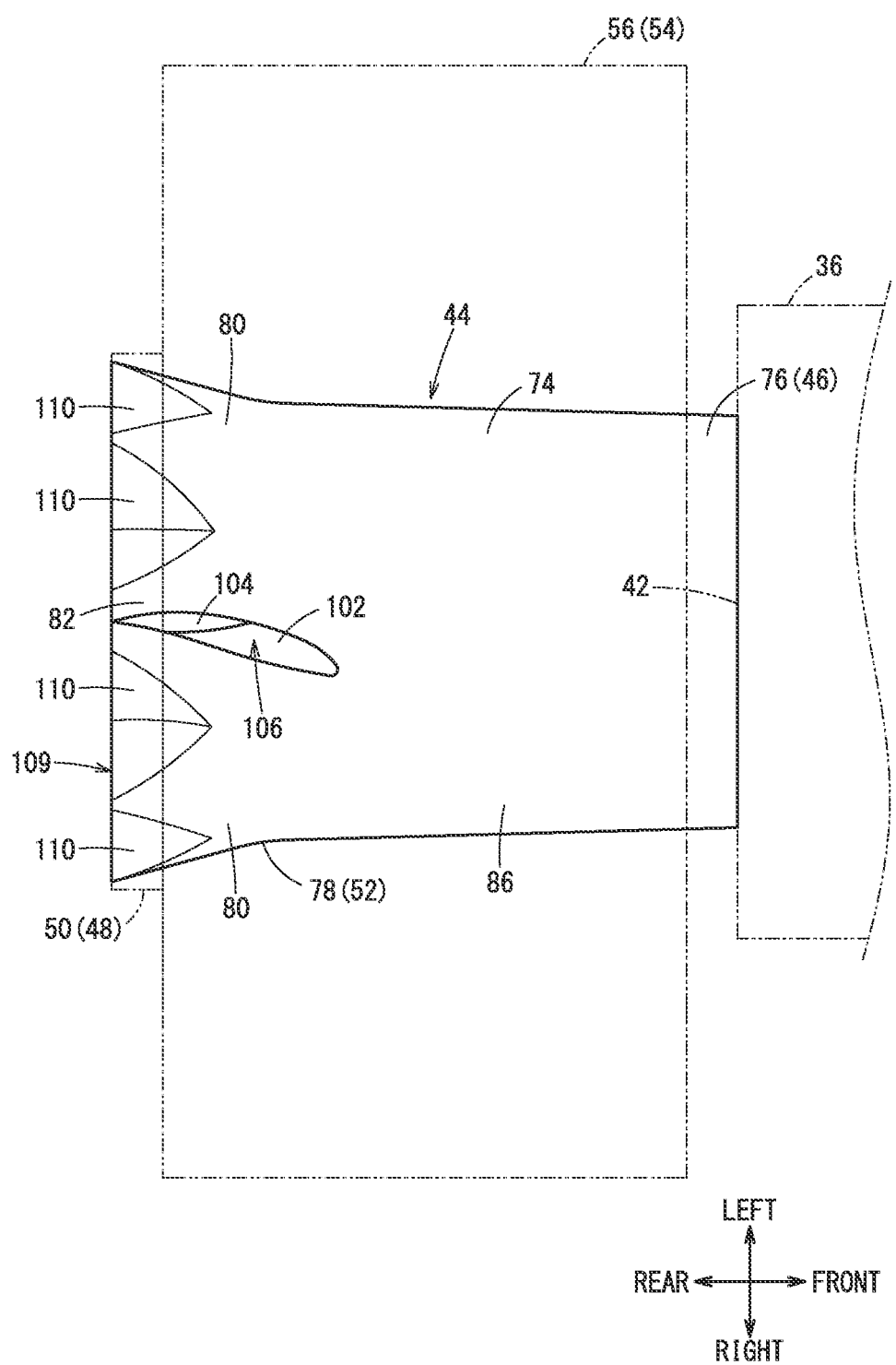
FIG. 9 is a plan view showing the structure of the mixer and the surrounding periphery thereof.

As shown in FIGS. 8 and 9, a plurality of introduction holes 102 are formed in the cylindrical portion 74. Specifically, the introduction holes 102 are each formed by a gap between two divided tubular portions 80 that lie adjacent to each other. The introduction holes 102 communicate through communication holes 104 with the discharge opening 96 (refer to FIG. 10). The discharge opening 96, the plurality of introduction holes 102, and the plurality of communication holes 104 constitute a plurality of guide holes 106. The second exhaust gas (the spent gas) from the radiator 54 is discharged into the exhaust pipe 48 through the plurality of guide holes 106.

Figure 12:
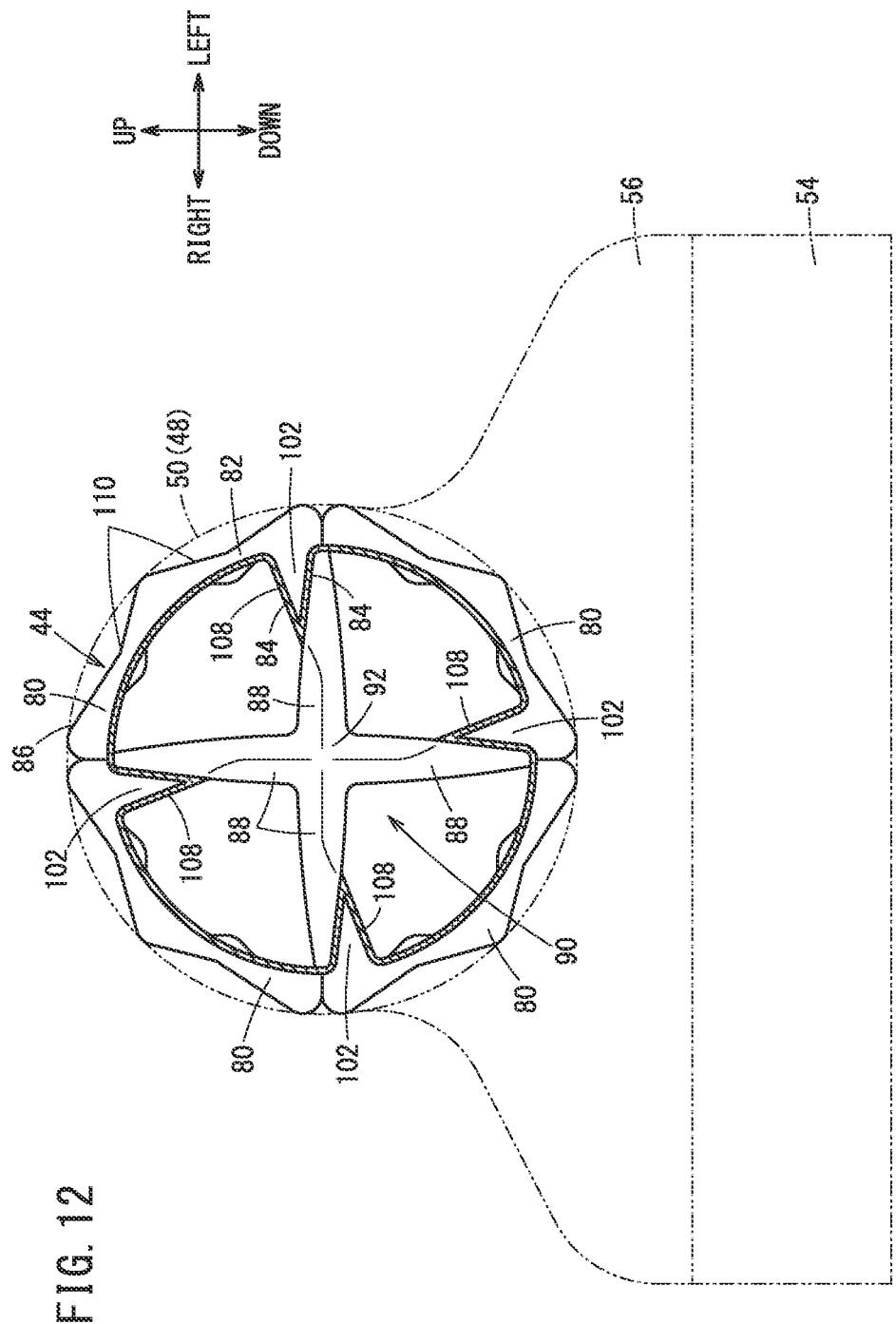
FIG. 12 is a cross-sectional view taken along line XII-XII of FIG. 8.
Figure 13:
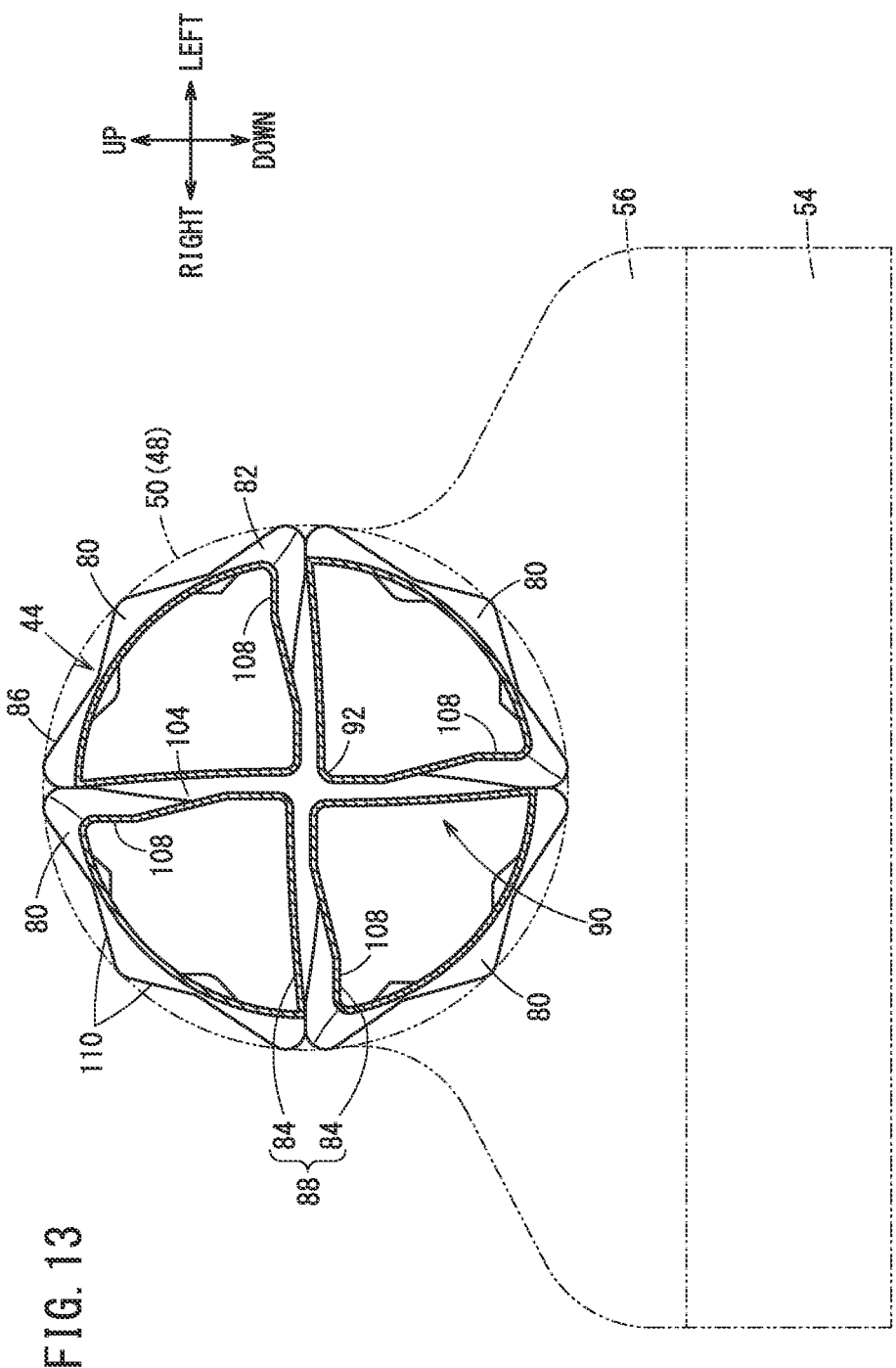
FIG. 13 is a cross-sectional view taken along line XIII-XIII of FIG. 8.
Figure 14:
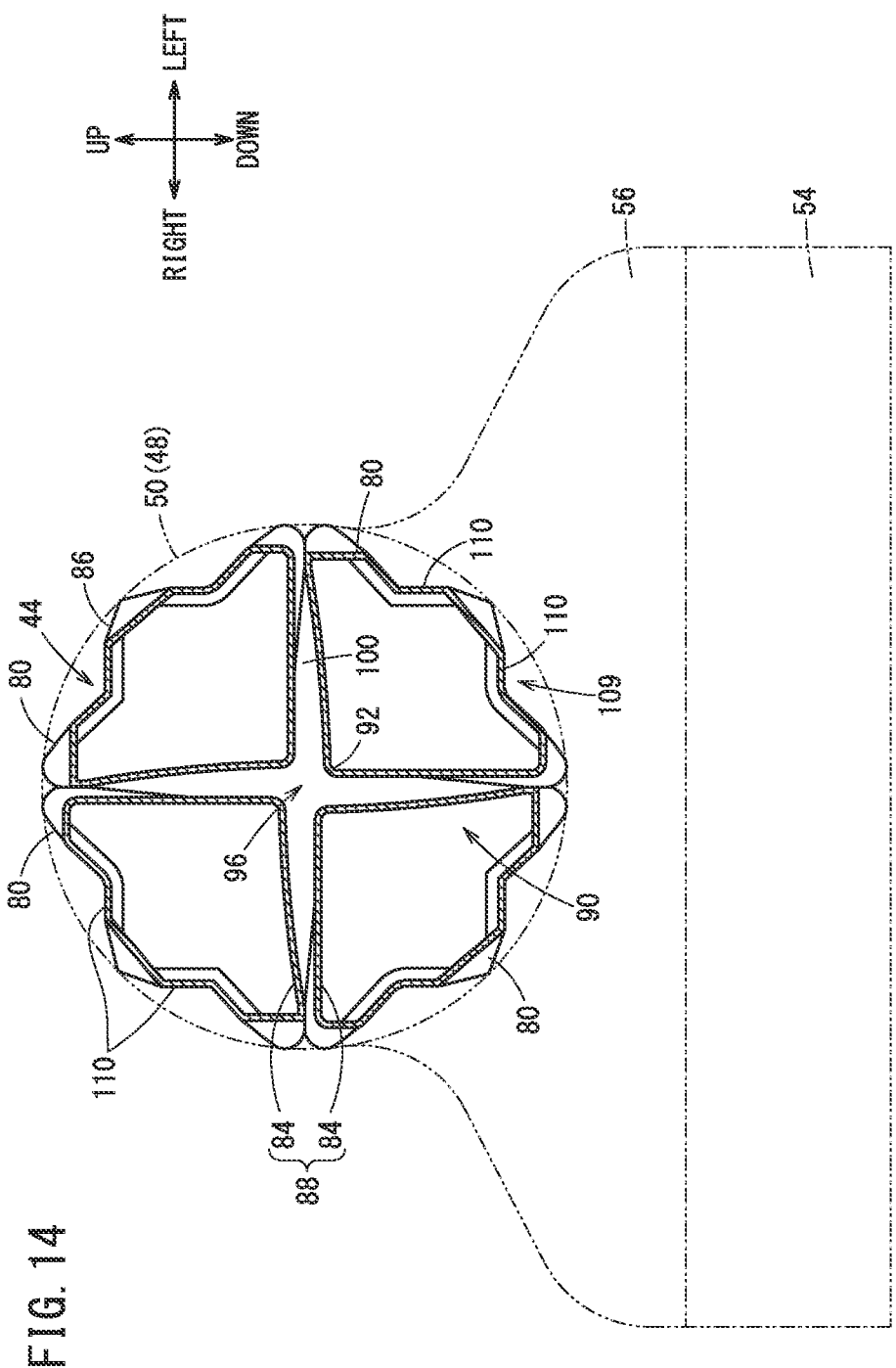
FIG. 14 is a cross-sectional view taken along line XIV-XIV of FIG. 8.

As shown in FIG. 12, the width of the introduction holes 102 in the circumferential direction of the cylindrical portion 74 becomes narrower as the introduction holes 102 approach the center of the cylindrical portion 74 (refer to FIG. 10). More specifically, the cross-sectional shape of the pair of inner side wall portions 84 is V-shaped. As shown in FIGS. 8 and 9, the width of the introduction holes 102 in the front-rear direction (the axial direction) of the cylindrical portion 74 becomes narrower as the introduction holes 102 approach the center of the cylindrical portion 74. In other word, the introduction holes 102 have a shape that becomes narrower as the introduction holes 102 approach the center of the cylindrical portion 74. As shown in FIG. 13, the width of the communication holes 104 in the circumferential direction of the cylindrical portion 74 becomes narrower as the communication holes 104 approach the center of the cylindrical portion 74 (refer to FIG. 10). Accordingly, the communication holes 104 have a shape that becomes narrower as the communication holes 104 approach the center of the cylindrical portion 74. The opening area of the introduction holes 102 is smaller than the opening area of the discharge opening 96.

Figure 11:
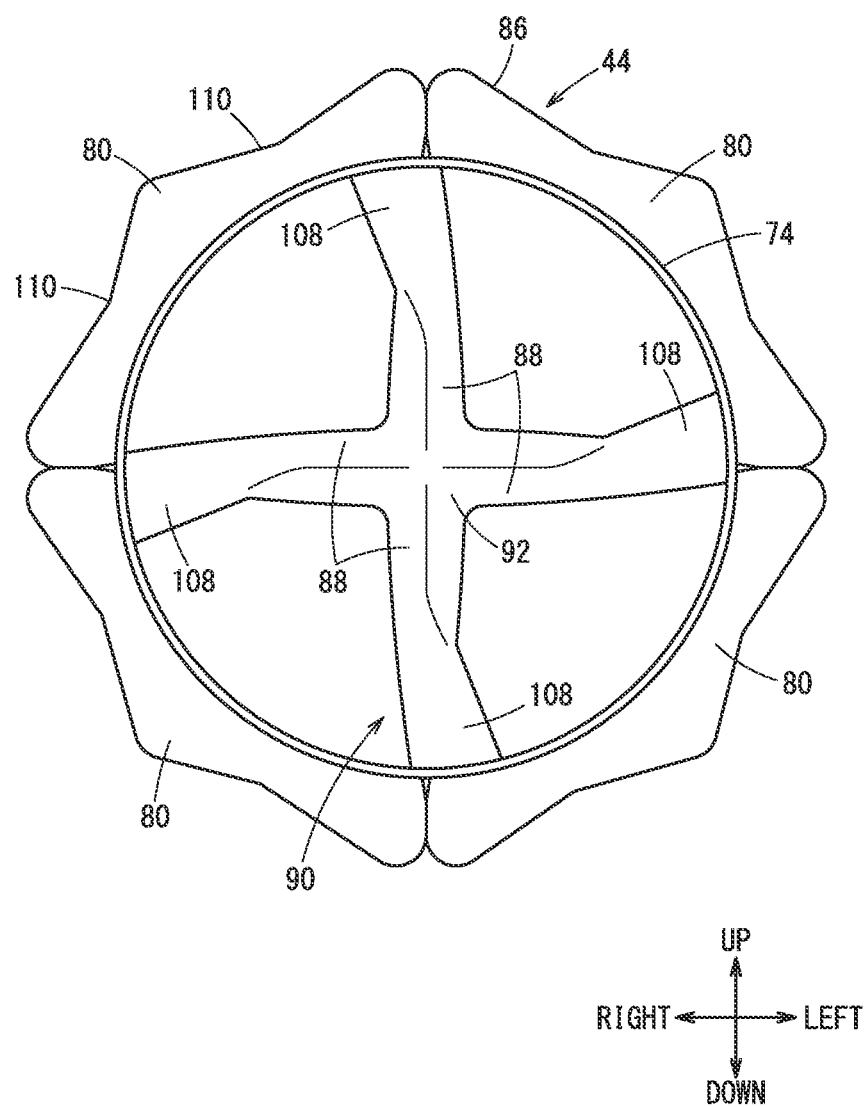
FIG. 11 is a front view of the mixer.

As shown in FIG. 11, the front end parts of the partitions 88 include curved portions 108. The curved portions 108 are curved in the circumferential direction of the cylindrical portion 74 as the curved portions 108 approach the outer wall 86 of the cylindrical portion 74. As shown in FIGS. 8 and 9, the curved portions 108 (refer to FIG. 11) are curved in the circumferential direction of the cylindrical portion 74 as the curved portions 108 approach the front end part 76 of the cylindrical portion 74. The introduction holes 102 are curved in the circumferential direction of the cylindrical portion 74 as the introduction holes 102 approach the front end part 76 of the cylindrical portion 74. Portions of the communication holes 104 in communication with the introduction holes 102 are curved in the circumferential direction of the cylindrical portion 74 as such portions approach the front end part 76 of the cylindrical portion 74 (see FIG. 13).

Each of the internal combustion engines 36 (refer to FIG. 3) includes a compressor, a combustor, and a turbine. The turbine is connected to the output shaft portion 40. In the internal combustion engine 36, the air introduced through the air intake port 60 is compressed by the compressor. The air having been compressed by the compressor is introduced into the combustor. The combustor causes the fuel to undergo combustion within the compressed air, and thereby generates a high temperature and high pressure gas. The turbine is rotated by the high temperature and high pressure gas that is generated in a combustion chamber. The turbine causes the output shaft portion 40 to rotate. The gas that has passed through the turbine is discharged from the exhaust port 42 as the exhaust gas (the first exhaust gas).

By rotation of the turbine, a swirling flow is generated in the first exhaust gas. The first exhaust gas that has become subjected to such a swirling flow is discharged from the exhaust port 42 into the cylindrical portion 74. As shown in FIG. 7, the curved portions 108 may be curved in a manner so that the swirling becomes weakened by the swirling flow being diverted. Specifically, as shown in FIG. 7, in the case that the swirling flow turns in a clockwise direction as viewed from the front, the curved portions 108 may be curved in a counterclockwise direction. Since the swirling flow and the curved portions 108 are oriented in mutually opposite directions, the swirling flow is weakened.

As shown in FIG. 10, a rear end portion of the outer wall 86 of the cylindrical portion 74 constitutes a notch nozzle 109. The notch nozzle 109 includes a plurality of notches 110. The notches 110 are disposed in the divided tubular portions 80. Two notches 110 are provided in each of the divided tubular portions 80. The two notches 110 are formed in the outer side wall portion 82 of the divided tubular portion 80. The two notches 110 are disposed alongside one another in the circumferential direction of the cylindrical portion 74. The notches 110 are inclined toward the rear end of the cylindrical portion 74. The notches 110 are recessed in a manner so as to become deeper as the notches 110 approach the rear end of the cylindrical portion 74. Moreover, it should be noted that only one notch 110 may be formed in each of the divided tubular portions 80. Alternatively, three or more notches 110 may be formed in each of the divided tubular portions 80. Further, the size of the plurality of notches 110 may differ depending on the distance thereof from the radiator 54.

Next, a description will be given concerning operation of the aircraft 10 (refer to FIG. 1). Air is introduced from the air intake port 60 into the internal combustion engine 36 (refer to FIG. 3). The compressor of the internal combustion engine 36 compresses the air that is introduced therein from the air intake port 60. The compressed air is introduced into the combustor. The combustor causes the fuel to undergo combustion within the compressed air, and thereby generates a high temperature and high pressure gas. The turbine is rotated by the high temperature and high pressure gas that is generated in the combustion chamber. The turbine causes the output shaft portion 40 to rotate. Due to the rotation of the turbine, the high temperature and high pressure gas is discharged from the exhaust port 42 into the mixer 44 in the form of the first exhaust gas that has become subjected to such a swirling flow.

The generator 38 generates electrical power accompanying rotation of the output shaft portion 40. The generator 38 supplies electrical power to a motor drive circuit (not shown). The motor drive circuit rotates at least one from among the eight take-off and landing rotors 20 (see FIG. 1) and the two cruising rotors 22.

The generator 38 also supplies electrical power to the electric pump 66. The electric pump 66 causes the coolant to circulate sequentially in order of the first coolant passage 68, the second coolant passage 70, and the third coolant passage 72. The generator 38 is cooled by the circulating coolant. The radiator 54 cools (carries out heat exchange with) the coolant by the air that is taken in from the air intake port 62. The air having been warmed by the radiator 54 is discharged as the second exhaust gas (the spent gas) from the exhaust port 64 into the exhaust pipe 48 via the connecting pipe 56.

The first exhaust gas from the internal combustion engine 36 flows into the cylindrical portion 74 (refer to FIG. 8). The first exhaust gas, which has become subjected to the swirling flow, flows into the cylindrical portion 74. The swirling flow is weakened due to being diverted by the curved portions 108 (refer to FIG. 7). The first exhaust gas whose swirling flow has become weakened passes through the interior of the divided tubular portions 80 (refer to FIG. 6). By rectifying the flow of the first exhaust gas using the partitions 88, the divided tubular portions 80 cause the direction of the momentum of the first exhaust gas to be diverted in the axial direction of the exhaust pipe 48 (the axial direction of the cylindrical portion 74). The divided tubular portions 80 discharge the first exhaust gas, which has become primarily composed of a component in the axial direction, into the exhaust pipe 48 (refer to FIG. 4).

The mixer 44 flares out from the front end part 76 toward the rear end part 78. The mixer 44 is flared out in consideration of the flow rate of the second exhaust gas that passes through the guide holes 106, and the volume of the mixer 44 itself. Specifically, the mixer 44 is flared out in a manner so that a flow passage cross-sectional area of the first exhaust gas along the axial direction of the mixer 44 is maintained constant. Due to the mixer 44 being made to flare out, a loss in pressure of the first exhaust gas can be reduced. Further, a stagnant pressure generated in the interior of the mixer 44 by the first exhaust gas can be reduced. By reducing the pressure loss and the stagnant pressure, the first exhaust gas and the second exhaust gas can be easily discharged from the mixer 44. Further, an adverse influence on the output of the internal combustion engines 36 can be suppressed.

The second exhaust gas from the radiator 54 (refer to FIG. 4) flows through a gap between the inner wall of the exhaust pipe 48 (refer to FIG. 5) and the outer wall 86 of the cylindrical portion 74. A portion of the second exhaust gas flows into the introduction holes 102 (refer to FIG. 8). The introduction holes 102 have a shape that becomes narrower as the introduction holes 102 approach the center of the cylindrical portion 74. Consequently, the flow of the second exhaust gas in the interior of the guide holes 106 is diverted toward a central portion of the discharge opening 96.

Further, the discharge opening 96 becomes wider as the discharge opening 96 approaches the center of the cylindrical portion 74. Consequently, the flow passage cross-sectional area of the second exhaust gas that flows into the introduction holes 102 and flows toward the center of the cylindrical portion 74 is restricted. As a result, it is possible to suppress a rise in the pressure of the second exhaust gas in the vicinity of the center of the cylindrical portion 74.

In the foregoing manner, the first exhaust gas is in a swirling flow until reaching the front end of the guide vane 90. Therefore, until reaching the front end of the guide vane 90, in the vicinity of the central part of the cylindrical portion 74, the pressure of the first exhaust gas becomes low due to a negative pressure caused by a swirl core. Further, the first exhaust gas is diverted in the axial direction of the exhaust pipe 48 by the plurality of partitions 88 of the guide vane 90. Consequently, a component in the axial direction becomes a main component of the first exhaust gas after having been diverted. As a result, the pressure of the first exhaust gas after having been diverted rises in the vicinity of the central part of the cylindrical portion 74. Therefore, it becomes difficult for the first exhaust gas after having been diverted to flow in the vicinity of the central part of the cylindrical portion 74. According to the present embodiment, by providing the discharge opening 96 in the aforementioned shape, a rise in pressure of the second exhaust gas in the vicinity of the center of the cylindrical portion 74 is suppressed. Consequently, a pressure gradient between the divided tubular portions 80 and the central portion of the discharge opening 96 is suppressed. As a result, in the divided tubular portions 80, the first exhaust gas flows easily in the vicinity of the central part of the cylindrical portion 74. Due to the first exhaust gas flowing in this manner, mixing of the first exhaust gas and the second exhaust gas in the interior of the exhaust pipe 48 is promoted. By promoting the mixing of the first exhaust gas and the second exhaust gas, the exhaust pipe 48 can be effectively made to function.

Figure 5:
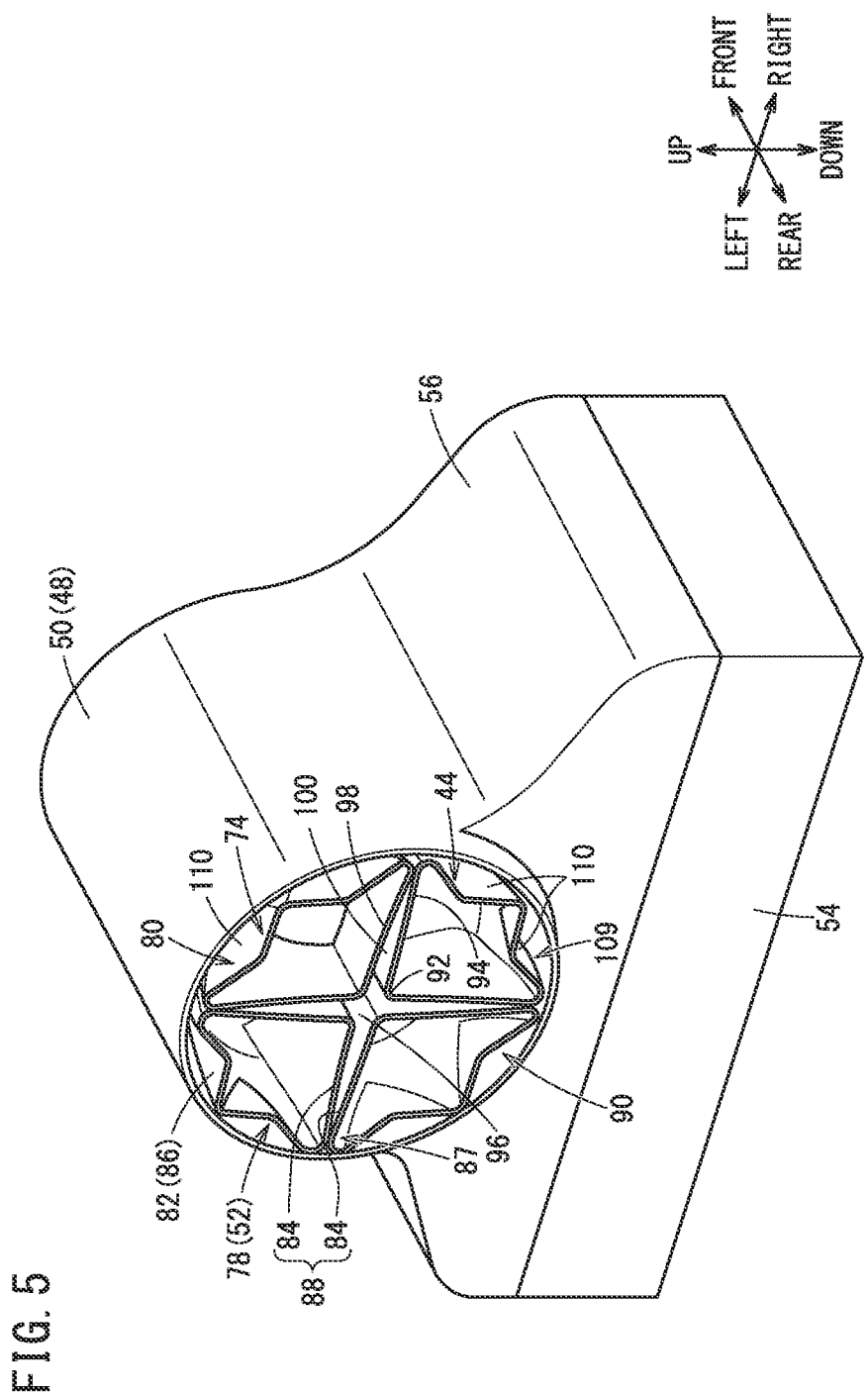
FIG. 5 is a perspective view showing the structure of a mixer and a surrounding periphery thereof.

As shown in FIG. 5, another portion of the second exhaust gas passes through gaps between the notches 110 and the exhaust pipe 48, and is discharged toward the rear of the mixer 44. The notches 110 are recessed as the notches 110 approach the rear end of the cylindrical portion 74. Consequently, the second exhaust gas is discharged toward the central portion in the interior of the exhaust pipe 48. Further, the opening area of the gaps between the notches 110 and the exhaust pipe 48 increases as the gaps approach the rear end of the cylindrical portion 74. Consequently, the contact area between the first exhaust gas and the second exhaust gas increases at the rear of the mixer 44. Owing to such an increase in the contact area, mixing of the first exhaust gas and the second exhaust gas is promoted. As a result, since the relatively high-speed first exhaust gas spreads out until reaching the vicinity of the inner wall of the exhaust pipe 48, functioning of the exhaust pipe 48 is facilitated.

More specifically, by the second exhaust gas being discharged in the manner described above, the first exhaust gas is discharged from the divided tubular portions 80 in a manner so as to be surrounded by the second exhaust gas. Consequently, the contact area between the first exhaust gas and the second exhaust gas increases. As a result, the first exhaust gas and the second exhaust gas can be mixed together satisfactorily at the rear of the mixer 44. By the first exhaust gas and the second exhaust gas being mixed together, the distribution of the momentum of the mixed gas in the interior of the exhaust pipe 48 is made uniform. Consequently, functioning of the exhaust pipe 48 becomes easily exhibited. The mixed gas is discharged to the exterior from the rear end of the exhaust pipe 48.

Incidentally, in the case that the mixer 44 is not provided, the first exhaust gas and the second exhaust gas flow along the inner wall of the exhaust pipe 48. The first exhaust gas and the second exhaust gas are not mixed together sufficiently. The mixed gas of the first exhaust gas and the second exhaust gas does not flow uniformly in the interior of the exhaust pipe 48. Since the mixed gas does not flow in a uniform manner, the flow of the mixed gas separates in the vicinity of the inner wall of the exhaust pipe 48. Consequently, a sufficient pressure gradient inside the exhaust pipe 48 cannot be ensured. As a result, the pressure at the exhaust port 42 of the internal combustion engine 36 increases, and the output efficiency of the internal combustion engine 36 may be adversely affected. In addition, the first exhaust gas has become subjected to the swirling flow and is discharged from the exhaust port 42 of the internal combustion engine 36 into the exhaust pipe 48. A loss in pressure caused by the swirling flow is generated by discharging the swirling flow. Due to the occurrence of the loss in pressure in the interior of the exhaust pipe 48, a case may occur in which the output efficiency of the internal combustion engines 36 is adversely affected.

In contrast thereto, according to the present embodiment, since the mixer 44 having the above-described structure is provided, the first exhaust gas, which is diverted in the axial direction of the exhaust pipe 48, and the second exhaust gas can be mixed together satisfactorily in the interior of the exhaust pipe 48. The mixed gas of the first exhaust gas and the second exhaust gas can flow uniformly in the interior of the exhaust pipe 48. Owing to this feature, the mixed gas is discharged from the exhaust pipe 48 in a state in which the pressure thereof is sufficiently restored in the interior of the exhaust pipe 48. As a result, it becomes possible to improve the output efficiency of the internal combustion engines 36.

Inventions that can be grasped from the above-described embodiment will be discussed below.

The first aspect of the present invention is the mixer (44) that mixes the first exhaust gas discharged from the internal combustion engine (36) and the second exhaust gas discharged from the radiator (54), the mixer comprising the cylindrical portion (74) including the front end part (76) into which the first exhaust gas is introduced, and the rear end part (78) from which the first exhaust gas is discharged, the guide vane (90) including the plurality of partitions (88) that extend radially toward the outer wall (86) of the cylindrical portion, the rear end part of the cylindrical portion being divided by the plurality of partitions into the plurality of divided tubular portions (80), the notch nozzle (109) constituting the outer wall of the cylindrical portion, and including the notches (110) formed respectively in the plurality of divided tubular portions, and the plurality of guide holes (106) formed to extend from the outer wall of the cylindrical portion to the rear end surface (94) of the guide vane, in order to discharge the second exhaust gas from the rear end surface of the guide vane.

According to the present invention, it is possible to improve the output efficiency of the internal combustion engine.

More specifically, the first exhaust gas is introduced from the internal combustion engine into the divided tubular portions via the cylindrical portion. The flow of the first exhaust gas introduced into the divided tubular portions is rectified by the partitions. The first exhaust gas, the flow of which has been rectified, is discharged into the exhaust pipe from the divided tubular portions. A portion of the second exhaust gas is discharged from the radiator into the exhaust pipe via the guide holes and from the rear end surface of the guide vane. The portion of the second exhaust gas is discharged to the vicinity of the center in the interior of the exhaust pipe. Another portion of the second exhaust gas is discharged from the radiator into the exhaust pipe through the notches. The first exhaust gas is discharged from the divided tubular portions in a manner so as to be surrounded by the second exhaust gas that is discharged from the rear end surface of the guide vane, and the second exhaust gas that is discharged from the notches. Consequently, since the contact area between the first exhaust gas and the second exhaust gas is increased, the first exhaust gas and the second exhaust gas can be sufficiently mixed together in the interior of the exhaust pipe. In addition, since the portion of the second exhaust gas is discharged to the vicinity of the center in the interior of the exhaust pipe, the first exhaust gas and the second exhaust gas can be mixed together in the vicinity of the center in the interior of the exhaust pipe. Accordingly, in the present invention, a pressure recovery function of the exhaust pipe can be improved. Further, it is possible to reduce a loss in pressure generated in the interior of the exhaust pipe due to a decrease in the pressure at the outlet of the internal combustion engine caused by the pressure difference in the interior of the exhaust pipe. By the loss in pressure being reduced, it becomes possible to improve the output efficiency of the internal combustion engine.

In the first aspect of the present invention, the plurality of guide holes may include the discharge opening (96) formed on the rear end surface of the guide vane, the plurality of introduction holes (102) formed in the outer wall of the cylindrical portion, and the plurality of communication holes (104) formed in the plurality of partitions, and configured to allow communication between the discharge opening and the plurality of introduction holes.

In accordance with such features, the second exhaust gas can be taken in from the introduction holes, and discharged from the discharge opening via the communication holes.

In the first aspect of the present invention, within the discharge opening, the width of the openings (100) formed in the rear end surfaces (98) of the plurality of partitions may become narrower as the openings approach the outer wall of the cylindrical portion.

In accordance with this feature, the flow of the second exhaust gas is diverted toward the central portion of the discharge opening. Further, the discharge opening becomes wider as the discharge opening approaches the center of the cylindrical portion. Consequently, the flow passage cross-sectional area of the second exhaust gas entering from the introduction holes and directed toward the center of the cylindrical portion is restricted. As a result, it is possible to suppress a rise in the pressure of the second exhaust gas in the vicinity of the center of the cylindrical portion.

In the foregoing manner, the first exhaust gas is in a swirling flow until reaching the front end of the guide vane. Therefore, until reaching the front end of the guide vane, in the vicinity of the central part of the cylindrical portion, the pressure of the first exhaust gas becomes low due to a negative pressure caused by the swirl core. Further, the first exhaust gas is diverted in the axial direction of the exhaust pipe by the plurality of partitions of the guide vane. Consequently, a component in the axial direction becomes a main component of the first exhaust gas after having been diverted. As a result, the pressure of the first exhaust gas after having been diverted rises in the vicinity of the central part of the cylindrical portion. Therefore, it becomes difficult for the first exhaust gas after having been diverted to flow in the vicinity of the central part of the cylindrical portion. According to the present invention, by providing the discharge opening in the aforementioned shape, a rise in pressure of the second exhaust gas in the vicinity of the center of the cylindrical portion is suppressed. Consequently, a pressure gradient between the divided tubular portions and the central portion of the discharge opening is suppressed. As a result, in the divided tubular portions, the first exhaust gas flows easily in the vicinity of the central part of the cylindrical portion. Due to the first exhaust gas flowing in this manner, mixing of the first exhaust gas and the second exhaust gas in the interior of the exhaust pipe is promoted. By promoting the mixing of the first exhaust gas and the second exhaust gas, the exhaust pipe can be effectively made to function.

In the first aspect of the present invention, the width of the plurality of introduction holes in the circumferential direction of the cylindrical portion may become narrower as the introduction holes approach the center of the cylindrical portion.

In accordance with this feature, the introduction holes have a shape that becomes narrower as the introduction holes approach the center of the cylindrical portion. In this case, the flow of the second exhaust gas introduced into the introduction holes is diverted toward the central portion of the discharge opening. In addition, the flow passage cross-sectional area of the second exhaust gas entering from the introduction holes and directed toward the center of the cylindrical portion is restricted. Accordingly, it is possible to suppress a rise in the pressure of the second exhaust gas in the vicinity of the center of the cylindrical portion.

In the first aspect of the present invention, the width of the plurality of introduction holes in the axial direction of the cylindrical portion may become narrower as the introduction holes approach the center of the cylindrical portion.

In this case as well, the introduction holes have a shape that becomes narrower as the introduction holes approach the center of the cylindrical portion. Consequently, the flow of the second exhaust gas introduced into the introduction holes is diverted toward the central portion of the discharge opening. In addition, the flow passage cross-sectional area of the second exhaust gas entering from the introduction holes and directed toward the center of the cylindrical portion is restricted. Accordingly, it is possible to suppress a rise in the pressure of the second exhaust gas in the vicinity of the center of the cylindrical portion.

In the first aspect of the present invention, the width of the plurality of communication holes in the circumferential direction of the cylindrical portion may become narrower as the communication holes approach the center of the cylindrical portion.

In accordance with this feature, the plurality of communication holes have a shape that becomes narrower as the communication holes approach the center of the cylindrical portion. In this case as well, the flow of the second exhaust gas is diverted toward the central portion of the discharge opening. In addition, since the flow passage cross-sectional area of the second exhaust gas directed toward the center of the cylindrical portion is restricted, a rise in pressure of the second exhaust gas in the vicinity of the center of the cylindrical portion can be suppressed.

In the first aspect of the present invention, the guide vane may include the base portion (92), and the plurality of partitions extending radially from the base portion, and further, the plurality of partitions may extend to the cylindrical portion.

In accordance with this feature, the flow of the first exhaust gas that has become subjected to the swirling flow can be efficiently rectified.

In the first aspect of the present invention, the front end part of each of the plurality of partitions may include the curved portion (108) which is curved in the circumferential direction of the cylindrical portion as the curved portion approaches the outer wall of the cylindrical portion.

In accordance with this feature, at a time when the first exhaust gas that has become subjected to the swirling flow has flowed into the cylindrical portion, the first exhaust gas is diverted by the curved portions, whereby the swirling flow becomes weakened. The momentum of the first exhaust gas whose swirling flow has become weakened is diverted in the axial direction of the mixer by the partitions. As a result, the first exhaust gas which has become primarily composed of a component in the axial direction can be discharged from the divided tubular portions.

In the first aspect of the present invention, the plurality of curved portions may be curved in the circumferential direction as the curved portions approach the front end part of the cylindrical portion.

In this case as well, at a time when the first exhaust gas that has become subjected to the swirling flow has flowed into the cylindrical portion, the first exhaust gas is diverted by the curved portions, whereby the swirling flow becomes weakened. The momentum of the first exhaust gas whose swirling flow has become weakened is diverted in the axial direction of the mixer by the partitions. As a result, the first exhaust gas which has become primarily composed of a component in the axial direction can be reliably discharged from the divided tubular portions.

In the first aspect of the present invention, the plurality of notches may be formed in the outer wall of the rear end part of each of the plurality of divided tubular portions.

In accordance with this feature, the second exhaust gas that flows through the notches, and the first exhaust gas discharged from the divided tubular portions can be mixed together satisfactorily.

In the first aspect of the present invention, the depth of the notches may become deeper as the notches approach the rear end of the cylindrical portion.

In accordance with this feature, the second exhaust gas that flows through the notches flows toward the first exhaust gas discharged from the divided tubular portions. As a result, the first exhaust gas and the second exhaust gas can be more satisfactorily mixed together.

The second aspect of the present invention is the mobile body comprising the mixer according to the first aspect, the internal combustion engine, the exhaust pipe (48) connected to the internal combustion engine, the generator (38) connected to the output shaft (40) of the internal combustion engine, and the radiator that cools the coolant of the generator by carrying out heat exchange between the coolant and the second exhaust gas, and discharges the second exhaust gas having been subjected to the heat exchange into the exhaust pipe, wherein the mixer is disposed on the inner side of the exhaust pipe, and mixes the first gas discharged from the internal combustion engine and the second exhaust gas discharged from the radiator.

In accordance with such features, the respective effects of the first aspect can be easily obtained. Further, the mobile body can be constructed in a state in which the output efficiency of the internal combustion engines is maintained.

The third aspect of the present invention is the mixer (44) that mixes the first exhaust gas discharged from the internal combustion engine (36) and the second exhaust gas discharged from the radiator (54), the mixer comprising the cylindrical portion (74) including the front end part (76) into which the first exhaust gas is introduced, and the rear end part (78) from which the first exhaust gas is discharged, the guide vane (90) including the plurality of partitions (88) that extend radially toward the outer wall (86) of the cylindrical portion, the rear end part of the cylindrical portion being divided by the plurality of partitions into the plurality of divided tubular portions (80), and the plurality of guide holes (106) formed to extend from the outer wall of the cylindrical portion to the rear end surface (94) of the guide vane, in order to discharge the second exhaust gas from the rear end surface of the guide vane, wherein the plurality of guide holes include the discharge opening (96) formed on the rear end surface of the guide vane, the plurality of introduction holes (102) formed in the outer wall of the cylindrical portion, and the plurality of communication holes (104) formed in the plurality of partitions, and configured to allow communication between the discharge opening and the plurality of introduction holes, and wherein, within the discharge opening, the width of the openings (100) formed in the rear end surfaces of the plurality of partitions becomes narrower as the openings approach the outer wall of the cylindrical portion, and the width of the plurality of introduction holes in the circumferential direction of the cylindrical portion becomes narrower as the introduction holes approach the center of the cylindrical portion.

According to the present invention, it is possible to improve the output efficiency of the internal combustion engine.

More specifically, the first exhaust gas is introduced from the internal combustion engine into the divided tubular portions via the cylindrical portion. The flow of the first exhaust gas introduced into the divided tubular portions is rectified by the partitions. The first exhaust gas, the flow of which has been rectified, is discharged into the exhaust pipe from the divided tubular portions. A portion of the second exhaust gas is discharged from the radiator into the exhaust pipe via the guide holes and from the rear end surface of the guide vane. The portion of the second exhaust gas is discharged to the vicinity of the center in the interior of the exhaust pipe. Another portion of the second exhaust gas is discharged from the radiator into the exhaust pipe through the notches. The first exhaust gas is discharged from the divided tubular portions in a manner so as to be surrounded by the second exhaust gas that is discharged from the rear end surface of the guide vane, and the second exhaust gas that is discharged from the notches. Consequently, since the contact area between the first exhaust gas and the second exhaust gas is increased, the first exhaust gas and the second exhaust gas can be sufficiently mixed together in the interior of the exhaust pipe. In addition, since the portion of the second exhaust gas is discharged to the vicinity of the center in the interior of the exhaust pipe, the first exhaust gas and the second exhaust gas can be mixed together in the vicinity of the center in the interior of the exhaust pipe. Accordingly, in the present invention, a pressure recovery function of the exhaust pipe can be improved. Further, it is possible to reduce a loss in pressure generated in the interior of the exhaust pipe due to a decrease in the pressure at the outlet of the internal combustion engine caused by the pressure difference in the interior of the exhaust pipe. By the loss in pressure being reduced, it becomes possible to improve the output efficiency of the internal combustion engine.

Further, according to the present invention, the second exhaust gas can be taken in from the introduction holes, and discharged from the discharge opening via the communication holes.

Furthermore, the flow of the second exhaust gas is diverted toward the central portion of the discharge opening. Further, the discharge opening becomes wider as the discharge opening approaches the center of the cylindrical portion. Consequently, the flow passage cross-sectional area of the second exhaust gas entering from the introduction holes and directed toward the center of the cylindrical portion is restricted. As a result, it is possible to suppress a rise in the pressure of the second exhaust gas in the vicinity of the center of the cylindrical portion.

In the foregoing manner, the first exhaust gas is in a swirling flow until reaching the front end of the guide vane. Therefore, until reaching the front end of the guide vane, in the vicinity of the central part of the cylindrical portion, the pressure of the first exhaust gas becomes low due to a negative pressure caused by the swirl core. Further, the first exhaust gas is diverted in the axial direction of the exhaust pipe by the plurality of partitions of the guide vane. Consequently, a component in the axial direction becomes a main component of the first exhaust gas after having been diverted. As a result, the pressure of the first exhaust gas after having been diverted rises in the vicinity of the central part of the cylindrical portion. Therefore, it becomes difficult for the first exhaust gas after having been diverted to flow in the vicinity of the central part of the cylindrical portion. According to the present invention, by providing the discharge opening in the aforementioned shape, a rise in pressure of the second exhaust gas in the vicinity of the center of the cylindrical portion is suppressed. Consequently, a pressure gradient between the divided tubular portions and the central portion of the discharge opening is suppressed. As a result, in the divided tubular portions, the first exhaust gas flows easily in the vicinity of the central part of the cylindrical portion. Due to the first exhaust gas flowing in this manner, mixing of the first exhaust gas and the second exhaust gas in the interior of the exhaust pipe is promoted. By promoting the mixing of the first exhaust gas and the second exhaust gas, the exhaust pipe can be effectively made to function.

In the third aspect of the present invention, the width of the plurality of introduction holes in the axial direction of the cylindrical portion may become narrower as the introduction holes approach the center of the cylindrical portion.

In this case as well, the introduction holes have a shape that becomes narrower as the introduction holes approach the center of the cylindrical portion. Consequently, the flow of the second exhaust gas introduced into the introduction holes is diverted toward the central portion of the discharge opening. In addition, the flow passage cross-sectional area of the second exhaust gas entering from the introduction holes and directed toward the center of the cylindrical portion is restricted. Accordingly, it is possible to suppress a rise in the pressure of the second exhaust gas in the vicinity of the center of the cylindrical portion.

In the third aspect of the present invention, the width of the plurality of communication holes in the circumferential direction may become narrower as the communication holes approach the center of the cylindrical portion.

In accordance with this feature, the plurality of communication holes have a shape that becomes narrower as the communication holes approach the center of the cylindrical portion. In this case as well, the flow of the second exhaust gas is diverted toward the central portion of the discharge opening. In addition, since the flow passage cross-sectional area of the second exhaust gas directed toward the center of the cylindrical portion is restricted, a rise in pressure of the second exhaust gas in the vicinity of the center of the cylindrical portion can be suppressed.

In the third aspect of the present invention, the guide vane may include the base portion (92), and the plurality of partitions extending radially from the base portion, and further, the plurality of partitions may extend to the cylindrical portion.

In accordance with this feature, the flow of the first exhaust gas that has become subjected to the swirling flow can be efficiently rectified.

In the third aspect of the present invention, the front end part of each of the plurality of partitions may include the curved portion (108) which is curved in the circumferential direction as the curved portion approaches the outer wall of the cylindrical portion.

In this case as well, at a time when the first exhaust gas that has become subjected to the swirling flow has flowed into the cylindrical portion, the first exhaust gas is diverted by the curved portions, whereby the swirling flow becomes weakened. The momentum of the first exhaust gas whose swirling flow has become weakened is diverted in the axial direction of the mixer by the partitions. As a result, the first exhaust gas which has become primarily composed of a component in the axial direction can be discharged from the divided tubular portions.

In the third aspect of the present invention, the plurality of curved portions may be curved in the circumferential direction as the curved portions approach the front end part of the cylindrical portion.

In this case as well, at a time when the first exhaust gas that has become subjected to the swirling flow has flowed into the cylindrical portion, the first exhaust gas is diverted by the curved portions, whereby the swirling flow becomes weakened. The momentum of the first exhaust gas whose swirling flow has become weakened is diverted in the axial direction of the mixer by the partitions. As a result, the first exhaust gas which has become primarily composed of a component in the axial direction can be reliably discharged from the divided tubular portions.

The fourth aspect of the present invention is the mobile body comprising the mixer according to the third aspect, the internal combustion engine, the exhaust pipe (48) connected to the internal combustion engine, the generator (38) connected to the output shaft (40) of the internal combustion engine, and the radiator that cools the coolant of the generator by carrying out heat exchange between the coolant and the second exhaust gas, and discharges the second exhaust gas having been subjected to the heat exchange into the exhaust pipe, wherein the mixer is disposed on the inner side of the exhaust pipe, and mixes the first gas discharged from the internal combustion engine and the second exhaust gas discharged from the radiator.

In accordance with such features, the respective effects of the third aspect can be easily obtained. Further, the mobile body can be constructed in a state in which the output efficiency of the internal combustion engines is maintained.

It should be noted that the present invention is not limited to the embodiments described above, but a variety of configurations may be adopted therein without departing from the essence and gist of the present invention.

What is claimed is:

1. A mixer that mixes a first exhaust gas discharged from an internal combustion engine and a second exhaust gas discharged from a radiator, the mixer comprising:
    a cylindrical portion including a front end part into which the first exhaust gas is introduced, and a rear end part from which the first exhaust gas is discharged;
    a guide vane including a plurality of partitions extending radially toward an outer wall of the cylindrical portion, the rear end part of the cylindrical portion being divided by the plurality of partitions into a plurality of divided tubular portions;
    a notch nozzle constituting the outer wall of the cylindrical portion, and including a notch formed in each of the plurality of divided tubular portions; and
    a plurality of guide holes formed to extend from the outer wall of the cylindrical portion to a rear end surface of the guide vane, in order to discharge the second exhaust gas from the rear end surface of the guide vane.

2. The mixer according to claim 1, wherein the plurality of guide holes include:
    a discharge opening formed on the rear end surface of the guide vane;
    a plurality of introduction holes formed in the outer wall of the cylindrical portion; and
    a plurality of communication holes formed in the plurality of partitions, and configured to allow communication between the discharge opening and the plurality of introduction holes.

3. The mixer according to claim 2, wherein within the discharge opening, a width of openings formed in rear end surfaces of the plurality of partitions becomes narrower as the openings approach the outer wall of the cylindrical portion.

4. The mixer according to claim 2, wherein
a width of the plurality of introduction holes in a circumferential direction of the cylindrical portion becomes narrower as the introduction holes approach a center of the cylindrical portion.

5. The mixer according to claim 2, wherein
a width of the plurality of introduction holes in an axial direction of the cylindrical portion becomes narrower as the introduction holes approach a center of the cylindrical portion.

6. The mixer according to claim 2, wherein
a width of the plurality of communication holes in a circumferential direction of the cylindrical portion becomes narrower as the communication holes approach a center of the cylindrical portion.

7. The mixer according to claim 1, wherein:
the guide vane includes a base portion, and the plurality of partitions extending radially from the base portion; and
the plurality of partitions extend to the cylindrical portion.

8. The mixer according to claim 7, wherein
a front end part of each of the plurality of partitions includes a curved portion curved in a circumferential direction of the cylindrical portion as the curved portion approaches the outer wall of the cylindrical portion.

9. The mixer according to claim 8, wherein
a plurality of the curved portions curve in the circumferential direction as the curved portions approach the front end part of the cylindrical portion.

10. The mixer according to claim 1, wherein
the notch is formed in plurality in an outer wall of a rear end part of each of the plurality of divided tubular portions.

11. The mixer according to claim 1, wherein
a depth of the notch becomes deeper as the notch approaches a rear end of the cylindrical portion.

12. A mobile body, comprising:
a mixer configured to mix a first exhaust gas discharged from an internal combustion engine and a second exhaust gas discharged from a radiator;
the internal combustion engine;
an exhaust pipe connected to the internal combustion engine;
a generator connected to an output shaft of the internal combustion engine; and
the radiator configured to cool a coolant of the generator by carrying out heat exchange between the coolant and the second exhaust gas, and to discharge the second exhaust gas having been subjected to the heat exchange into the exhaust pipe,
wherein the mixer is disposed on an inner side of the exhaust pipe to mix the first gas discharged from the internal combustion engine and the second exhaust gas discharged from the radiator, the mixer including:
a cylindrical portion including a front end part into which the first exhaust gas is introduced, and a rear end part from which the first exhaust gas is discharged;
a guide vane including a plurality of partitions extending radially toward an outer wall of the cylindrical portion, the rear end part of the cylindrical portion being divided by the plurality of partitions into a plurality of divided tubular portions;

a notch nozzle constituting the outer wall of the cylindrical portion, and including a notch formed in each of the plurality of divided tubular portions; and a plurality of guide holes formed to extend from the outer wall of the cylindrical portion to a rear end surface of the guide vane, in order to discharge the second exhaust gas from the rear end surface of the guide vane.

13. A mixer that mixes a first exhaust gas discharged from an internal combustion engine and a second exhaust gas discharged from a radiator, the mixer comprising:

a cylindrical portion including a front end part into which the first exhaust gas is introduced, and a rear end part from which the first exhaust gas is discharged;

a guide vane including a plurality of partitions extending radially toward an outer wall of the cylindrical portion, the rear end part of the cylindrical portion being divided by the plurality of partitions into a plurality of divided tubular portions; and a plurality of guide holes formed to extend from the outer wall of the cylindrical portion to a rear end surface of the guide vane, in order to discharge the second exhaust gas from the rear end surface of the guide vane, wherein the plurality of guide holes include:

a discharge opening formed on the rear end surface of the guide vane;

a plurality of introduction holes formed in the outer wall of the cylindrical portion; and a plurality of communication holes formed in the plurality of partitions, and configured to allow communication between the discharge opening and the plurality of introduction holes, and wherein, within the discharge opening, a width of openings formed in rear end surfaces of the plurality of partitions becomes narrower as the openings approach the outer wall of the cylindrical portion, and a width of the plurality of introduction holes in a circumferential direction of the cylindrical portion becomes narrower as the introduction holes approach a center of the cylindrical portion.

14. The mixer according to claim 13, wherein
a width of the plurality of introduction holes in an axial direction of the cylindrical portion becomes narrower as the introduction holes approach the center of the cylindrical portion.

15. The mixer according to claim 13, wherein
a width of the plurality of communication holes in the circumferential direction becomes narrower as the communication holes approach the center of the cylindrical portion.

16. The mixer according to claim 13, wherein:
the guide vane includes a base portion, and the plurality of partitions extending radially from the base portion; and
the plurality of partitions extend to the cylindrical portion.

17. The mixer according to claim 16, wherein
a front end part of each of the plurality of partitions includes a curved portion curved in the circumferential direction as the curved portion approaches the outer wall of the cylindrical portion.

18. The mixer according to claim 17, wherein
a plurality of the curved portions curve in the circumferential direction as the curved portions approach the front end part of the cylindrical portion.

19. A mobile body comprising:
a mixer configured to mix a first exhaust gas discharged from an internal combustion engine and a second exhaust gas discharged from a radiator;
the internal combustion engine;
an exhaust pipe connected to the internal combustion engine;
a generator connected to an output shaft of the internal combustion engine; and
the radiator configured to cool a coolant of the generator by carrying out heat exchange between the coolant and the second exhaust gas, and to discharge the second exhaust gas having been subjected to the heat exchange into the exhaust pipe,
wherein the mixer is disposed on an inner side of the exhaust pipe to mix the first gas discharged from the internal combustion engine and the second exhaust gas discharged from the radiator, the mixer including:
a cylindrical portion including a front end part into which the first exhaust gas is introduced, and a rear end part from which the first exhaust gas is discharged;
a guide vane including a plurality of partitions extending radially toward an outer wall of the cylindrical portion, the rear end part of the cylindrical portion being divided by the plurality of partitions into a plurality of divided tubular portions; and
a plurality of guide holes formed to extend from the outer wall of the cylindrical portion to a rear end surface of the guide vane, in order to discharge the second exhaust gas from the rear end surface of the guide vane,
wherein the plurality of guide holes include:
a discharge opening formed on the rear end surface of the guide vane;
a plurality of introduction holes formed in the outer wall of the cylindrical portion; and
a plurality of communication holes formed in the plurality of partitions, and configured to allow communication between the discharge opening and the plurality of introduction holes,
and wherein, within the discharge opening, a width of openings formed in rear end surfaces of the plurality of partitions becomes narrower as the openings approach the outer wall of the cylindrical portion, and
a width of the plurality of introduction holes in a circumferential direction of the cylindrical portion becomes narrower as the introduction holes approach a center of the cylindrical portion.

* * * * *